United States Patent
Sun et al.

(10) Patent No.: US 9,649,764 B1
(45) Date of Patent: May 16, 2017

(54) SYSTEMS AND METHODS FOR PLANNING A ROBOT GRASP THAT CAN WITHSTAND TASK DISTURBANCES

(71) Applicants: Yu Sun, Tampa, FL (US); Yun Lin, Tampa, FL (US)

(72) Inventors: Yu Sun, Tampa, FL (US); Yun Lin, Tampa, FL (US)

(73) Assignee: University of South Florida, Tampa, FL (US)

( * ) Notice: Subject to any disclaimer, the term of this patent is extended or adjusted under 35 U.S.C. 154(b) by 27 days.

(21) Appl. No.: 14/569,694

(22) Filed: Dec. 13, 2014

Related U.S. Application Data

(60) Provisional application No. 61/915,812, filed on Dec. 13, 2013.

(51) Int. Cl.
*G06F 7/00* (2006.01)
*G05B 19/18* (2006.01)
*B25J 9/16* (2006.01)
*B25J 9/00* (2006.01)

(52) U.S. Cl.
CPC ........... *B25J 9/1612* (2013.01); *B25J 9/0081* (2013.01); *B25J 9/1605* (2013.01); *B25J 9/1687* (2013.01); *Y10S 901/02* (2013.01); *Y10S 901/04* (2013.01)

(58) Field of Classification Search
USPC .... 700/253, 19, 28, 97; 318/568.11, 568.12, 318/568.2; 701/98
See application file for complete search history.

(56) References Cited

U.S. PATENT DOCUMENTS

| | | | | |
|---|---|---|---|---|
| 4,695,156 A | * | 9/1987 | Taft | G01S 11/12 348/139 |
| 6,229,552 B1 | * | 5/2001 | Koga | G06T 13/40 345/420 |
| 9,321,176 B1 | * | 4/2016 | Sun | B25J 9/1612 |
| 2013/0245824 A1 | * | 9/2013 | Barajas | B25J 9/1664 700/253 |

OTHER PUBLICATIONS

Kang et al. "A Robot System taht Observes and Replicates Grasping Tasks", : Proceedings of the Fifth International Conference on Computer vision 1995, IEEE, Jun. 20-23, 1995, pp. 1093-1099.*
Kang et al. "A Robot System that Observes and Replicates Grasping Tasks", o Proceedings of the Fifth International Conference on Computer vision 1995, IEEE, Jun. 20-23, 1995, pp. 1093-1099.*

(Continued)

*Primary Examiner* — Muhammad Shafi
(74) *Attorney, Agent, or Firm* — Thomas | Horstemeyer, LLP

(57) ABSTRACT

In one embodiment, a system and method for planning a robot grasp involve measuring interaction forces imposed on an object by an environment while a task is demonstrated using the object to obtain a disturbance distribution dataset, modeling a task requirement based upon the disturbance distribution dataset, identifying robot grasp types that can be used to satisfy the task requirement, calculating a grasp wrench space for each identified robot grasp, and calculating a grasp quality of each grasp.

22 Claims, 18 Drawing Sheets

(56) References Cited

OTHER PUBLICATIONS

Ferrari et al. "Planning Optimal Grasps", Proceedings of teh 1992 IEEE, International Conference on Robotics and Aviation, Nice, France, May 1992, pp. 2290-2295.*
Bicchi, et al., "Robotic Grasping and Contact: A Review", IEEE International Conference on Robotics and Automation, vol. 1, p. 348-353, 2000.
Brock, et al., "Motion for Manipulation Tasks", In Bruno Siciliano and Oussama Khatib, Springer Handbook of Robotics, pp. 615-645, 2008.
Goldfeder, et al., "Grasp Planning Via Decomposition Trees", In Robotics and Automation, pp. 4679-4684, 2007 IEEE.
Lin, et al., "Task-Oriented Grasp Planning Based on Disturbance Distribution", in ISRR, 2013.
Lin, et al., "Grasp Planning to Maximize Task Coverage", The International Journal of Robotics Research, Dec. 2013.
Aleotti, et al., "Interactive teaching of task-oriented robot grasps", Robotics and Autonomous Systems, 58(5), 2010.
Billard, et al., "Robot programming by demonstration", In Handbook of Robotices, MIT Press, 2008.
Borst, et al., "Grasp planning: how to choose a suitable task wrench space", IEEE International Conference on Robotics and automation, vol. 1, May 2004.
Dai, et al., "Functional analysis of grasping motion", IEEE/RSJ International conference on intelligent robots and systems, 2013.
Ferrari, et al., "Planning optimal grasps", IEEE International conference on robotics and automation, vol. 3, May 1992.
Han, et al., "Grasp analysis as liner matrix inequality problems", IEEE transactions on robotics and automation, 16(6), 2000.
Haschke, et al., "Task-oriented quality measures for dextrous grasping", IEEE International Symposium on Computtional Intelligence in robotics and automation, Jun. 2005.
Hsiao, et al., "Bayesian grasp planning", In ICRA workshop on Mobile Manipulation: Integrating perception and manipulation, 2011.
Kirkpatrick et al., "Quantitative steinitz's theorems with applications to multifingered grasping", Discrete & Computational Geometry, 7(1), 1992.
Li, et al., "Task-oriented optimal grasping by mulitfingered robot hands", IEEE Journal of Robots and Automation, 4(1), Feb. 1988.
Lin, et al., "Grasp mapping using locality perserving projection and knn regression", In Interntional conference of robotics and automation, vol. 3, May 2013.
Lin, et al., "Learning grasping force demonstration", In IEEE International conference on robotics and automation, 2012.
Liu, et al, "On quality functions for grasp synthesis, fixture planning, and coordinated manipulation", IEEE transactions on automation science and engineering, 1(2), 2004.
Miller, et al., "Automatic grasp planning using shape primitives", IEEE international conference on robotics and automation, vol. 2, Sep. 2003.
Nguyen, et al., "Constructing force-closure grasps", The International Journal of robotics research, 7(3), 1998.
Pollard, et al., "Closure and quality equivalence for efficient synthesis of grasps from examples", The interntional journal of robotics research, 23(6), 2004.
Pollard, "Parallel methods for synthesizing who-hand grasps from generalized proto-types", PhD. Dissertation, 1994.
Ponce, et al., "On computing three-finger force-closure grasps of polygonal objects", IEEE transactions oon robotics an automation, 11(6), 1995.
Ren, et al., "Human-object-object-interaction affordance", In IEEE workshop in Robot, IEEE, 2013.
Roa, et al, "Finding locally optimum force-closure grasps", Robotics and Computer-Intergrated Manufacturing, 25(3), 2009.
Romero, et al., "Human-to-robot mapping of grasps", IEEE/RSJ International conference on intelligent robots and systems, WS on grasp and Task Learning by Imitation, 2008.
Rosales, et al., "Synthesizing grasp configurations with specified contact regions", The International Journal of robotics research 0(4), 2011.
Sahbani, et al., "An overview of 3d object grasp synthesis algorithms", Robotics and autonomous systems, 60(3), 2012.
Sun, et al., "Human-object-object-interaction affordance", In Robotics and autonomous system, In Press, 2013.
Zhu, et al., "Synthesis of force-closure grasps on 3-d objects based on the q distance", IEEE transactions on robotics and automation, 19(4), 2003.
Prattichizzo, et al., "Grasping", Springer Handbook of robotics, 2008.

* cited by examiner

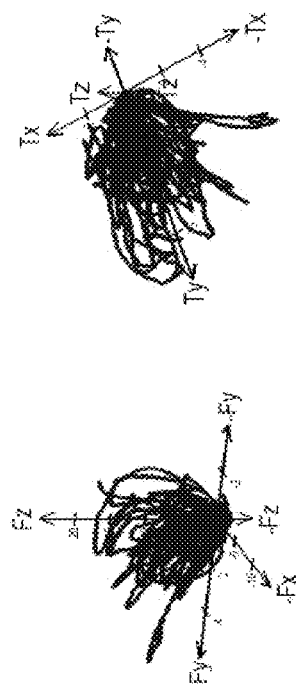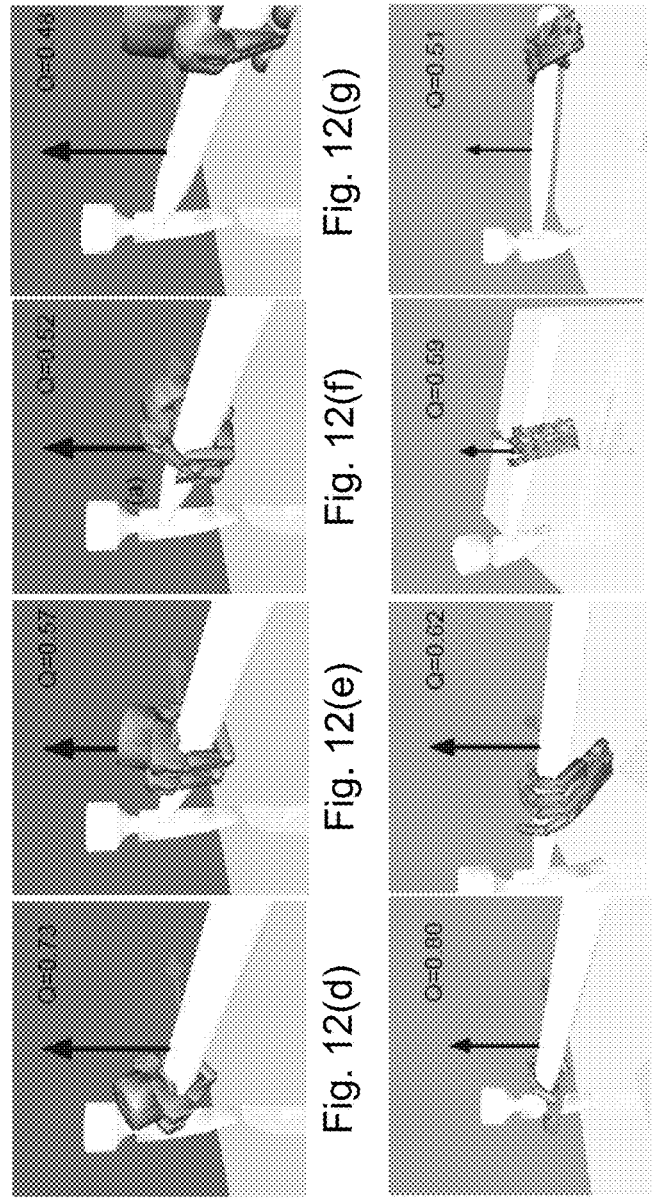
Fig. 12(a) Fig. 12(b) Fig. 12(c)
Fig. 12(d) Fig. 12(e) Fig. 12(f) Fig. 12(g)
Fig. 12(h) Fig. 12(i) Fig. 12(j) Fig. 12(k)

SYSTEMS AND METHODS FOR PLANNING A ROBOT GRASP THAT CAN WITHSTAND TASK DISTURBANCES

CROSS-REFERENCE TO RELATED APPLICATION

This application claims priority to U.S. Provisional Application Ser. No. 61/915,812, filed Dec. 13, 2013, which is hereby incorporated by reference herein in its entirety.

BACKGROUND

Manipulation and grasp have been active research areas in robotics for several decades. One of the primary goals of the research is the choice of an appropriate grasp, in terms of task requirement and stability properties, given an object associated with a manipulation task to be performed. Such a problem is referred to as the grasp synthesis problem. To solve this problem, different approaches and algorithms have been developed for the robotic hand to execute a stable manipulation task.

One solution to the grasp synthesis problem is grasp planning. Grasp planning uses optimization mathematics to search for the optimal contact placement on an object, which gives rise to difficulty in choosing a quality criterion for the optimization procedure. One widely-used quality criterion is the force closure that measures the capability of a grasp to apply a certain amount of force on an object to resist disturbances in any direction, defined as the radius of the largest six-dimensional wrench space sphere centered at the origin and enclosed with the unit grasp wrench space (GWS).

The above approach is task-independent and, therefore, an evenly distributed disturbance in all directions is assumed. In many manipulation tasks, however, such as drinking, writing, and handling a screwdriver, a task-related grasp criterion must be applied for the choice of appropriate grasp configurations for different task requirements. A manipulation task refers to the process of moving or rearranging objects within an environment. To perform a task, the object to be manipulated would interact with the environment and suffer from outside disturbance. For example, the screwdriver can experience disturbance in the form of resistance forces of a screw that is being driven by the screwdriver. A task-oriented grasp should be able to resist the force disturbance required for a task. That is, the grasp should be maintained (i.e., the object should not be dropped) in spite of the force disturbance.

One typical task-oriented grasp method is to choose a suitable task wrench space (TWS) and then measure how well it can be fitted into a GWS. A challenge with this approach is that it is difficult to model the disturbance associated with the task to obtain the TWS and sensors are required to measure the contact regions and contact normals in human demonstration to obtain the TWS in reality. For this reason, most approaches empirically approximate the TWS rather than actually measure it.

Another difficulty of task-oriented grasp planning is the computational complexity of searching in a high-dimensional hand configuration space. It is, therefore, natural to introduce human experience relative to a task. Data gloves have been used in prior research to map human-hand to robotic-hand workspace and capture the TWS in virtual reality. A database of candidate grasps was considered, and grasps were evaluated by a task-related quality measure. However, the correspondence problem has been a crucial issue to map between two different configuration spaces of the human hand and the robotic hand. Other research has involved searching for candidate grasps using a shape-matching algorithm and evaluating the grasps using a task-oriented criterion. However, the TWS is also modeled by experience rather than actually measuring it from the demonstrated task.

From the above discussion, it can be appreciated that it would be desirable to have an alternative approach for planning a task-oriented grasp that can withstand disturbance from the environment associated with performing the task.

BRIEF DESCRIPTION OF THE DRAWINGS

The present disclosure may be better understood with reference to the following figures. Matching reference numerals designate corresponding parts throughout the figures, which are not necessarily drawn to scale.

FIGS. 12(a) and 12(b) are graphs that show the distribution of task wrenches for a hammer.

FIGS. 12(c)-12(g) are computer renderings of five different hand configurations of a Barrett hand model for the hammer. Scale k was set to be 20.

FIGS. 12(h) and 12(k) are computer renderings of four different hand configurations of the Barrett hand model. Scale k was set to be 20.

FIGS. 13(a)-13(c) are graphs that show measured task disturbance projected in three-dimensional force subspaces.

FIGS. 13(d)-13(f) are graphs that show measured task disturbance projected in three-dimensional torque subspaces.

FIGS. 13(g)-13(i) are computer renderings of the optimization result from the disclosed task disturbance-based planning approach.

FIGS. 13(j)-13(l) are computer renderings of the result from non-task oriented planning, which optimizes the epsilon quality.

FIGS. 13(m)-13(o) are graphs that show the proposed quality Q as a function of scale k for the hand configurations shown in FIGS. 14(j)-14(l).

DETAILED DESCRIPTION

Figure 1A:
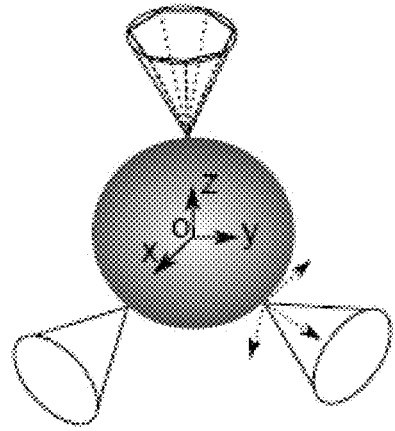
FIG. 1(a) illustrates friction cones associated with a grasp.

As described above, it would be desirable to have an alternative approach for planning a task-oriented grasp that can withstand disturbance associated with performing the task. Disclosed herein are systems and methods for planning task-oriented robot grasps based upon measurement of a distribution of task disturbance. Once the disturbance distribution has been measured, a search can be conducted for a grasp that covers the most significant part of the disturbance distribution. Rather than using a uniformly distributed task wrench space (TWS), the disclosed approach models a manipulation task with a non-parametric statistical distribution model built from the disturbance data captured during the task demonstrations. By maximizing a grasp quality criterion, the resulting grasp is more likely to cover the most frequent disturbances. In some embodiments, the candidate grasps are computed from a reduced configuration space that is confined by a set of given thumb placements and thumb directions to reduce the computational complexity of the search in a high-dimensional robotic hand configuration space, as well as to avoid the correspondence problem.

In some embodiments, the disclosed approach involves measuring the task property (force distributions) from human demonstration data instead of estimating or approximating the task property. Such demonstration can be performed within an actual environment or within a virtual environment. In either case, the task-related disturbance from the environment acting on the manipulated object is captured during execution of the task.

The task requirement can be modeled based on the distribution of the measured task disturbance. Instead of assuming an evenly-distributed TWS, the disclosed approach takes into account the task disturbance distribution measured from human demonstration, since it is possible that disturbance wrenches occur more frequently in some areas than others. Therefore, the importance of the wrenches can be weighted with the disturbance distribution and more weights can be applied to wrenches with high disturbance distribution rather than to wrenches that occur less frequently. For instance, a knife can be used for cutting as well as spreading butter. Because the interactive forces on the knife in the two tasks have two different sets of distributions, two different grasps are usually used in the two tasks.

In some embodiments, a task-oriented grasp quality metric, referred to herein as the task coverage grasp quality metric, can be used. In some cases, the planned grasp will not necessarily cover the entire TWS, which contains noise from the measurement of the disturbance. The metric is quantified by the proportion of disturbance that the grasp covers, which takes into account the noise of real TWS data. As a result, the targeted grasp can cover the most frequent disturbances, instead of covering the area with scattered distributed disturbance (which occurs rarely and is possibly noise).

In some embodiments, the computational complexity of the search in high-dimensional robotic hand configuration space, as well as to avoid a correspondence problem, can be reduced by computing the candidate grasp from a set of given thumb placements rather than contact points on an object surface. One advantage of thumb placement is that it is independent of the physical constraints of a given hand, which has the problem of solving the inverse kinematics that satisfies the constraints imposed by contact points. Every thumb placement is associated with the direction the thumb should point to, which further reduces the search space of wrist positions and orientations.

In the following disclosure, various specific embodiments are described. It is to be understood that those embodiments are example implementations of the disclosed inventions and that alternative embodiments are possible. All such embodiments are intended to fall within the scope of this disclosure.

Grasp Preliminaries

Considering a multi-fingered robotic hand grasping an object, a grasp comprises multiple contact points. Assuming a hard finger model of the grasp, i.e., point contact with friction (PCWF), the most common friction model is Coulomb's friction model in which, at each local contact, the tangential force is bounded by the normal force, $f^t \leq \mu f^n$, where $f^t$ is the tangential force component, $f^n$ is the normal force component, and $\mu$ is the coefficient of friction. Thus, all feasible contact forces are constrained to the friction cone. FIG. 1(a) illustrates three such friction cones. Each friction cone has a vertex at the contact point and a central axis along the contact normal with an opening angle of $2 \tan^{-1} \mu$. For the convenience of computation, the circular friction cone is usually approximated with an m-sided pyramid (see top cone in FIG. 1(a)). In such a case, any contact force $f_i$ at the ith contact that is within the constraint of the friction cone can be represented as a convex combination of the m force vectors on the boundary of the cone:

$$f_i \approx \sum_{j=1}^{m} \alpha_j f_{ij} \tag{1}$$

where the coefficient $\alpha_j \geq 0$, and $\Sigma_{j=1}^{m} \alpha_j = 1$.

The three-dimensional force vector $f_i$ and torque vector $\tau_i$ can be written as a wrench $w_i$ and each contact can be described with a six-dimensional vector of wrench $w_i$:

$$w_i = \begin{bmatrix} f_i \\ \tau_i = \lambda(d_i \times f_i) \end{bmatrix} \tag{2}$$

where $d_i$ is the vector from global origin of the object to the contact point and $\lambda$ is the scale factor of torque to force conversion. $\lambda$ can be set to be the inverse of the maximum radius from the torque origin so that torque is independent of the object scale.

Given n contact points of a grasp, the unit grasp wrench space (GWS), written as W(G), can be defined as the linear combination of the unit wrench space at each contact:

$$W(G) = \left\{ w \mid w = \sum_{i=1}^{mn} \alpha_i w_i, \alpha_i \geq 0, \sum_{i=1}^{mn} \alpha_i = 1, |w_i| = 1 \right\} \tag{3}$$

Figure 1B:
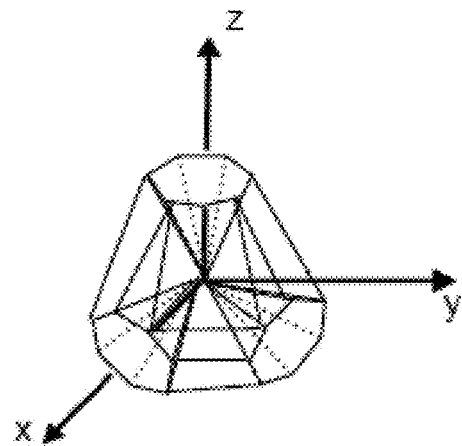
FIG. 1(b) illustrates a wrench space of the grasp of FIG. 1(a).

In other words, the unit GWS is the set of all possible resultant wrenches that can be applied to the object by all the contacts if applying unit magnitude of contact force, i.e., the convex hull of the contact wrenches. This is shown in FIG. 1(b).

Figure 2:
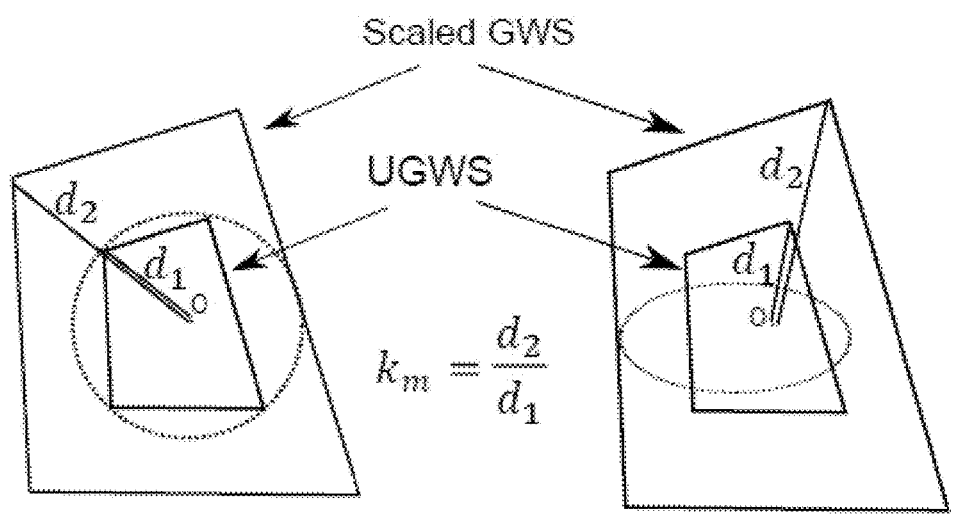
FIG. 2 is a diagram that illustrates grasp quality measures for a task ball (left) and a task ellipsoid (right).

A typical way of evaluating grasp quality is to compute force-closure, i.e., the ability of a grasp to equilibrate external force and moment in any direction by applying appropriate forces. It implies that, if the origin of the wrench space is in the convex hull, then the grasp is force-closure. Similar to the GWS, a task can also be described as the space of disturbance wrenches that must be applied to the object. Ferrari and Canny quantified the force-closure property by the magnitude of the contact wrenches that can compensate the disturbance wrench in the worst case. If no task-oriented information is provided to form a subset of the whole space of wrenches, a typical TWS is a six-dimensional ball $T_{ball}$ centered at the wrench space origin, where external disturbance is uniformly weighted (left figure in FIG. 2). The grasp quality is the reciprocal of the scale to enlarge the GWS so that it contains the whole TWS:

$$Q(G) = \frac{1}{k_m} \tag{4}$$

$$k_m(G) = \min(k) \mid T_{ball} \in k \cdot W(G) \tag{5}$$

In other words, $k_m(G)$ is the minimum magnitude of contact force in order to resist all task wrenches. The larger $k_m$ is, the greater is the effort needed for a grasp to encounter the task wrench along the weakest direction. The grasp planning is to find the maximum Q(G), which is the reciprocal of $k_m(G)$.

Measuring the Task Wrench

Instead of using a uniform ball, the quality measure in Equation 4 can also be used for different task requirements. Li and Sastry developed a quality criterion to measure the ability of a grasp to perform a TWS using a six-dimensional wrench space ellipsoid to better approximate a task (right figure in FIG. 2). Although this measure took the task requirement into account, they stated that the data acquisition was difficult. To obtain the TWS in reality, contact normals on the object need to be recorded, which remains a challenge. Sensors are required to obtain the contact regions and contact normals. While most researchers focus on the problems of defining the TWS quality and the measurements of how good a grasp can be fitted into a TWS, few address this practical problem of how to measure the demonstrated TWS.

Figure 3A:
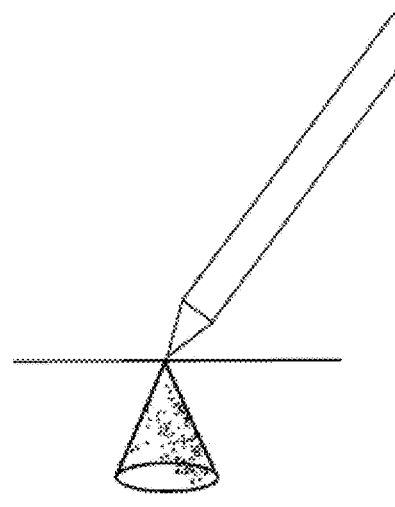
FIG. 3(a) illustrates a disturbance distribution for a writing task performed with a pen.
Figure 3B:
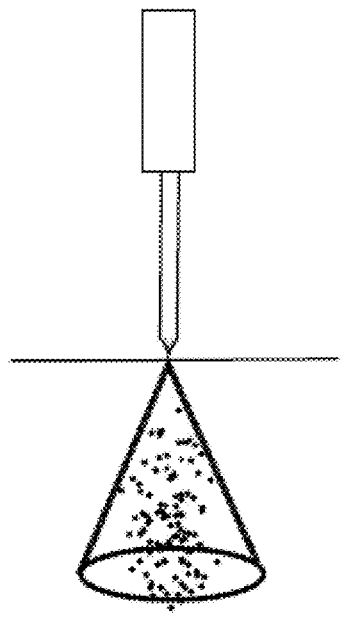
FIG. 3(b) illustrates a disturbance distribution for a screwing task performed with a screwdriver.

Most of the existing work relied on experience to estimate TWS and predict the contact disturbance. In tool manipulation, such as with a pen, screwdriver, scoop, fork, toothbrush, etc., for example, the contact disturbance is expected to be applied on the tip of those tools. Then, the empirical task-oriented disturbance wrench space is a friction cone applied to the tip. The wrench space is assumed to be uniformly distributed in the space. However, even if the disturbance is applied to the same location of different tools, the disturbance wrench can distribute unevenly over the whole TWS. Consider, for example, a writing task versus manipulation of a screwdriver. Although both require the grasp to resist disturbance force applied to the tip, they have different disturbance distributions. As illustrated in FIG. 3, the disturbance distribution for the pen (FIG. 3(a)) is different from the disturbance distributions for the screwdriver (FIG. 3(b)). For the writing task, the main disturbance wrench is the force pointed to the upper-left direction and the torque generated along with the force. Hence, the GWS should be able to apply the opposite force to resist the disturbance, which is distributed primarily in the right area of the friction cone shown in the figure, whereas the main disturbance wrench of the screwdriver is the normal force to the surface and the rotational friction around the principle axis of the screwdriver. Also, the expected disturbance force of the screwdriver is larger than that of the pen. Therefore, different distributions of wrenches in a TWS would result in different preferred grasps.

Figure 4A:
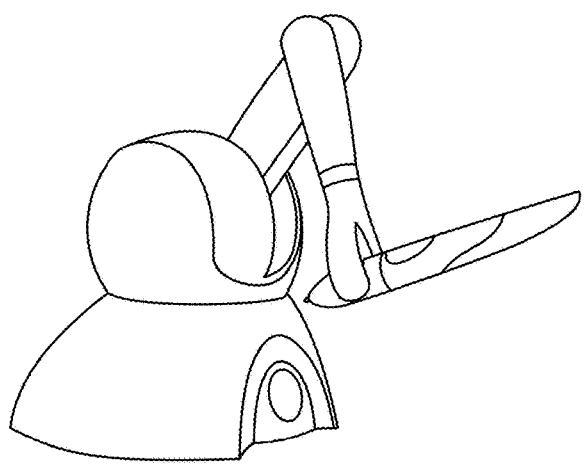
FIG. 4(a) is a drawing of a haptic device that can be used to perform a virtual demonstration.
Figure 4B:
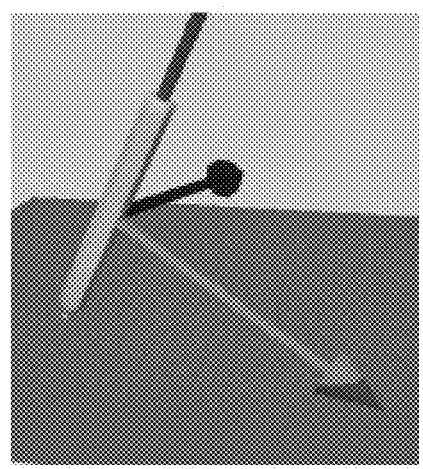
FIG. 4(b) is a computer rendering of a virtual environment in which an object is controlled using the haptic device of FIG. 4(a).
Figure 5A:
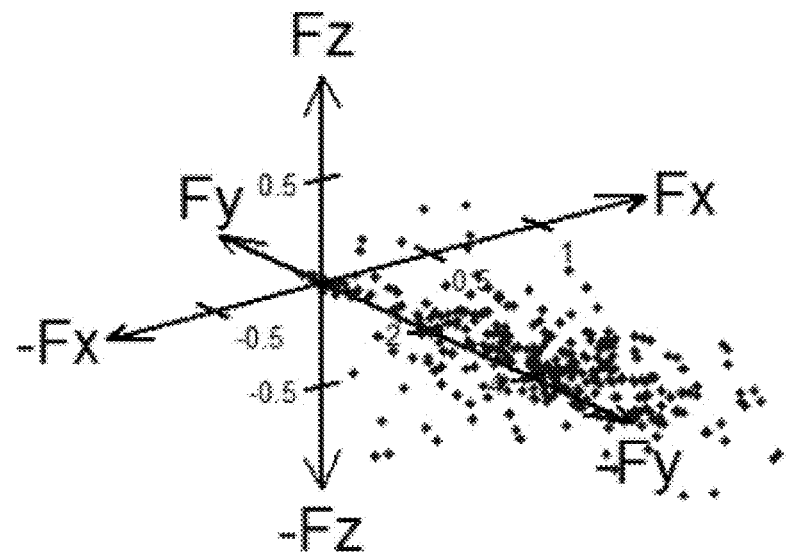
FIG. 5(a) is a graph that plots disturbance forces measured during the simulation of manipulating a screwdriver.
Figure 5B:
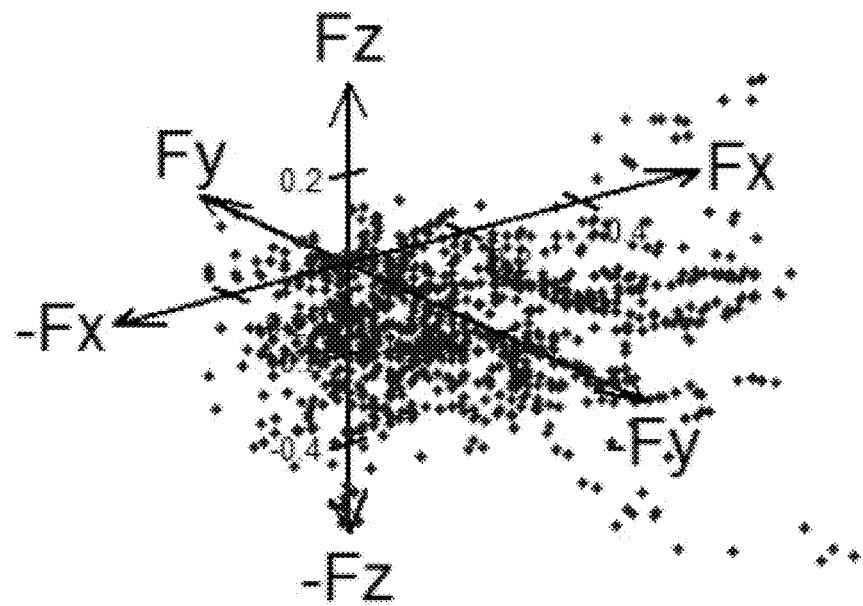
FIG. 5(b) is a graph that plots disturbance forces measured.
Figure 5C:
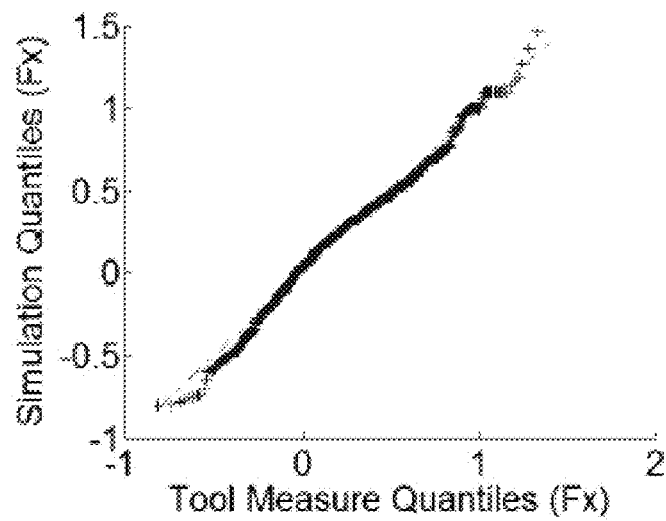
FIGS. 5(c)-5(e) are Q-Q plots of the distribution of Fx, Fy, and Fz, respectively, in simulation against the real tool measure.
Figure 5D:
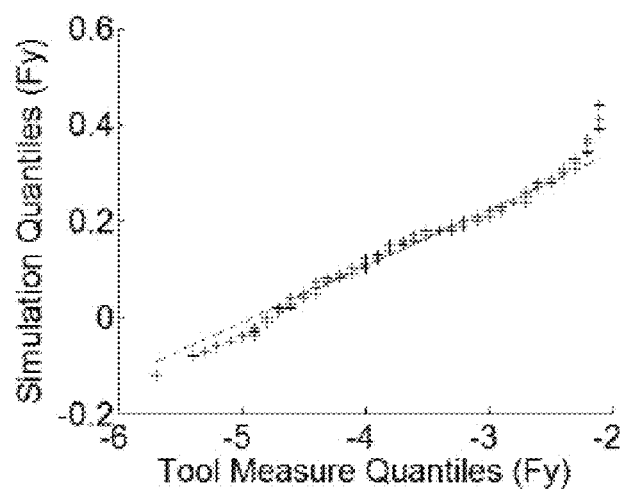
Figure 5E:
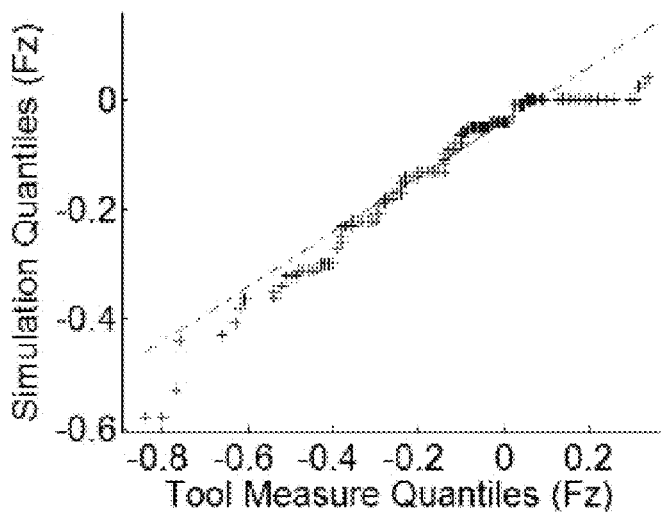
Figure 6A:
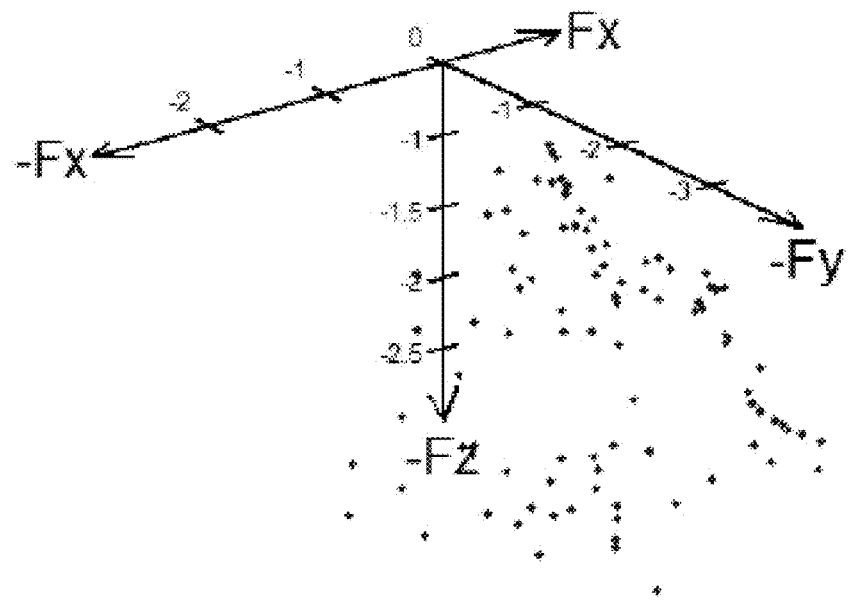
FIG. 6(a) is a graph that plots disturbance forces measured during the simulation of manipulating a knife.
Figure 6B:
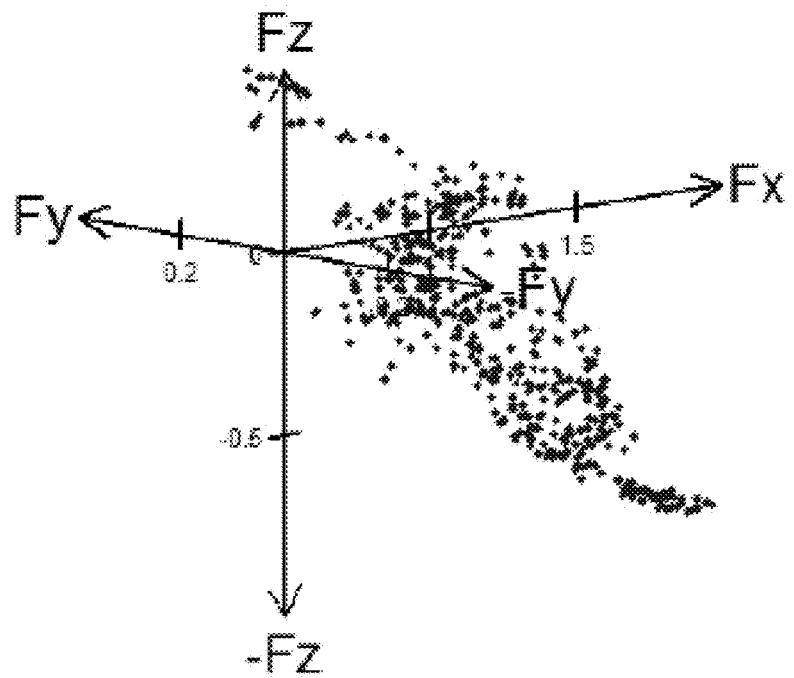
FIG. 6(b) is a graph that plots disturbance forces.
Figure 6C:
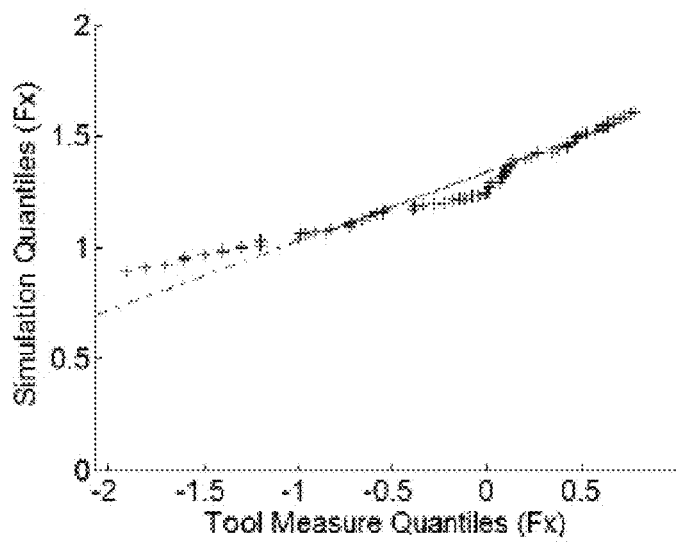
FIGS. 6(c)-6(e) are Q-Q plots of the distribution of Fx, Fy, and Fz, respectively, in simulation against the real tool measure.
Figure 6D:
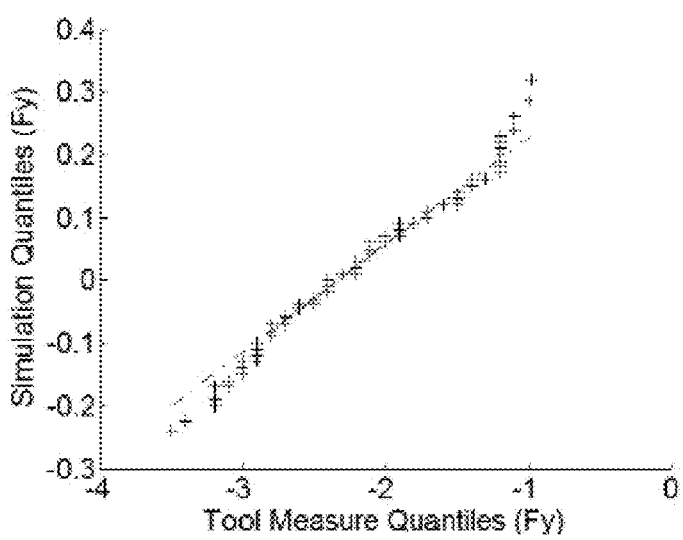
Figure 6E:
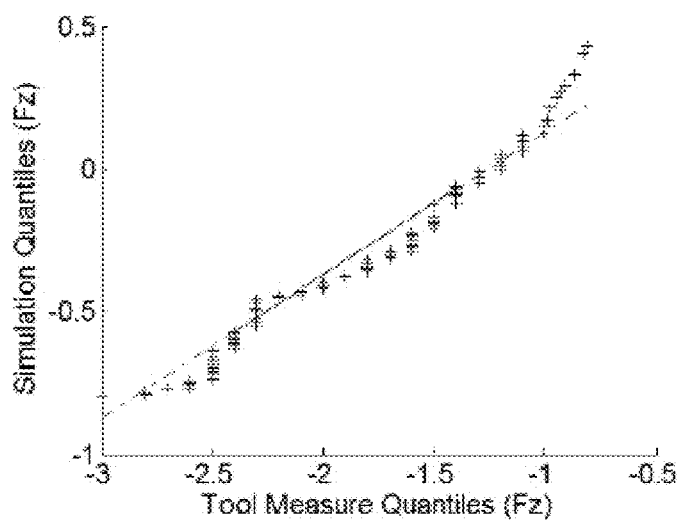
Figure 7A:
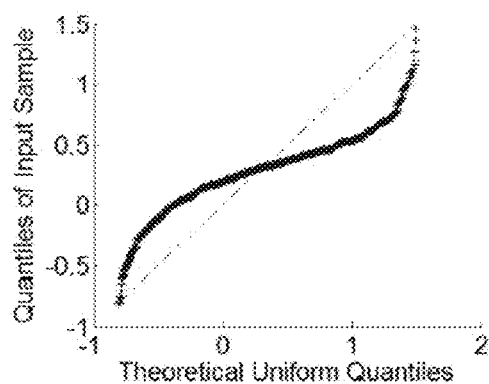
FIGS. 7(a)-7(d) are Q-Q plots that compare sample disturbance data with two standard distribution models, with FIG. 7(a) showing the Q-Q plot for a screwdriver task using sample data versus uniform distribution, FIG. 7(b) showing the Q-Q plot for a screwdriver task using sample data versus normal distribution, FIG. 7(c) showing the Q-Q plot for a knife task using sample data versus uniform distribution, and FIG. 7(d) showing the Q-Q plot for a knife task using sample data versus normal distribution.
Figure 7B:
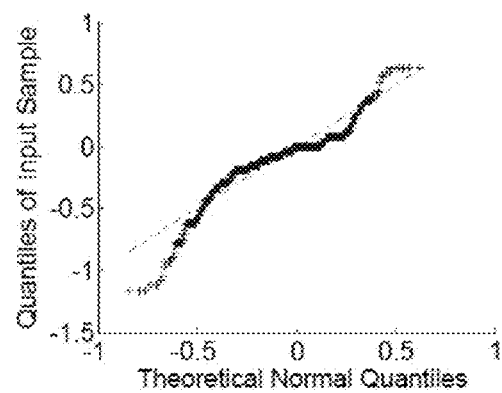
Figure 7C:
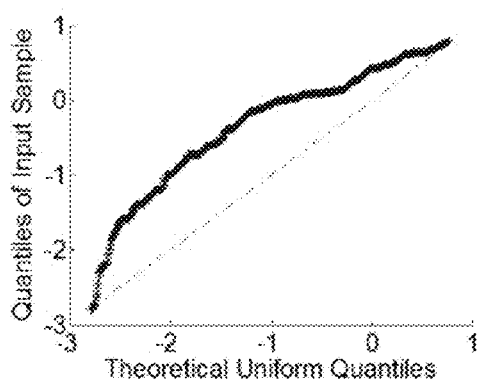
Figure 7D:
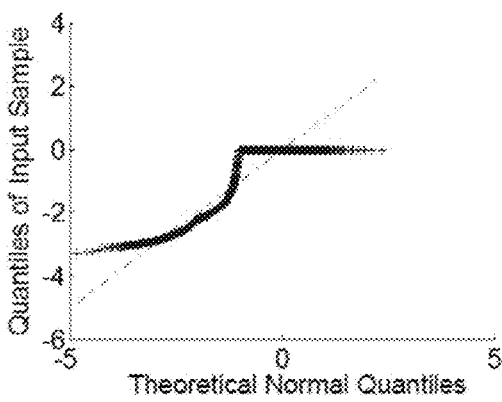

In some embodiments, the distribution of the disturbance wrench space can be measured in a virtual environment. In such a case, a user interface, such a haptic device, can be used by a user to control a virtual object (tool) within a virtual environment. FIG. 4(a) illustrates an example of such a haptic device in the form of a Phantom Omni haptic device. FIG. 4(b) illustrates a virtual environment in which a virtual pen, controlled by the haptic device, is used to perform a writing task. The haptic device provides the user with a haptic feedback of the interaction force experienced by the object with the virtual environment. In experiments performed by the inventors, a virtual reality environment was developed based on Chai3D, an open source C++ library for computing haptic feedback, visualization, and interactive real-time simulation. Chai3D integrates C++ library of Open Dynamic Engine (ODE) for collision detection and simulating dynamics and OpenGL library for graphical visualization. The QHull library was integrated to calculate convex hulls. The collision force of the tool with the environment was captured in every iteration. The TWS (TWS) is a set of all wrenches measured over time t:

$$TWS=\{w(t)|w(t)=w_c(t)+w_n(t)\} \quad (6)$$

where w(t) is a wrench at time t, $w_c(t)$ is the contact wrench of the tool with the environment, and $w_n(t)$ is a non-contact wrench. The non-contact wrench $w_n(t)$ is an offset wrench that includes forces that are not acting on the surface of the object, such as gravity and the inertial force. In some embodiments, for simplicity, these forces can be considered to include only gravity if the user moves the tool smoothly and slowly, in which case the motion of the tool can be assumed to be pseudostatic. Gravity can be considered as the force acting on the center of mass of the object. If the center of mass is set as the torque origin, the wrench compensated by the gravity is a wrench with zero torque. If no contact occurs during the manipulation, only gravity is required to be compensated, e.g., when lifting a book on an open palm, where the task wrench stabilizes the effect of gravity along a single direction. Note that the direction of the gravity disturbance relative to the object coordinate frame changes with the motion of the object, e.g., when rotating a book by a hand, where the task wrench stabilizes the effect of gravity along multiple directions.

Verification of Simulated Disturbance Data

Since the disclosed grasp planning approach relies heavily on disturbance measure, it is necessary to validate how realistic the simulated disturbance distribution is. Thus, the distribution of simulated disturbance was compared to real measurement on a physical tool. To measure a real task disturbance, a physical tool was designed that incorporated a six-axis Nano17 force sensor connecting a handle and a stick. This tool can mimic a long-shaped tool that has a handle, such as a screwdriver, a knife, a fork, a scoop and a marker, etc. The same manipulation tasks can be demonstrated both in simulation and using the physical tool. The captured disturbance data was compared in the two environments.

FIGS. 5 and 6 show disturbance force measurements from two example manipulation tasks: a screwdriver manipulation and a cutting task using a knife. In both figures, sub-figures (a) and (b) show the disturbance forces in simulation and on the physical tool, respectively. To compare the distributions, Q-Q plots were used to plot the relationship between the two sets of data, simulation and reality, as given in FIGS. 5(c)-(e) and 6(c)-(e) for the two example tasks. A Q-Q plot is a probability plot that is utilized to determine if two data sets have a common distribution by plotting their quantiles against each other. It is an excellent tool to compare the shapes of distributions and provide a graphical view of how their distribution properties such as location, scale, and skewness are similar or different. It can be observed that the plots in this study are roughly a straight line except a few outliers, indicating that the distributions of simulation are close to the real measurement with a longer (e.g., FIG. 6(d)) or a shorter tail (e.g., FIG. 5(e)). Some shifts in location and spread are reasonable, since the scale in simulation can be adjusted by the parameters of the haptic generation model. Therefore, it was verified that the simulation can be used to characterize a task distribution.

Studying the Distribution Model

The distribution data was compared with a standard uniform distribution and a normal distribution by a Q-Q plot to study the distribution of the disturbance. FIG. 7 shows Q-Q plots of sample data against a standard uniform distribution and a normal distribution for the two aforementioned example tasks. According to the Q-Q plots versus a uniform distribution shown in FIGS. 7(a) and 7(c), both task disturbance distributions are distinct from a uniform distribution, so the task disturbance is not evenly distributed. The distributions of task disturbance are not close to a normal distribution either (FIGS. 7(b) and (d)), since none of them lie roughly on a line. Therefore, the distribution model of a task disturbance cannot be characterized as a uniform distribution or a normal distribution.

Because the probability distribution model of disturbance is unknown and the shapes of Q-Q plot change with tasks, a non-parametric statistical distribution of the disturbance was built from the dataset of TWS measured by demonstration for each task. Then, to reduce the computational complexity, a smaller set of data points could be randomly downsampled based on the non-parametric statistical distribution. In alternative embodiments, the task requirement can be modeled as a parametric statistical distribution, such as a Gaussian mixture model with expectation and maximization.

Quality Measure Based on Distribution of Task Disturbance

The quality measure $k_m$ in Equation 4 measures how much effort a grasp needs to cover the whole required TWS, which quantifies a constraint in the worst case where the robot should not drop the object.

Figure 8A:
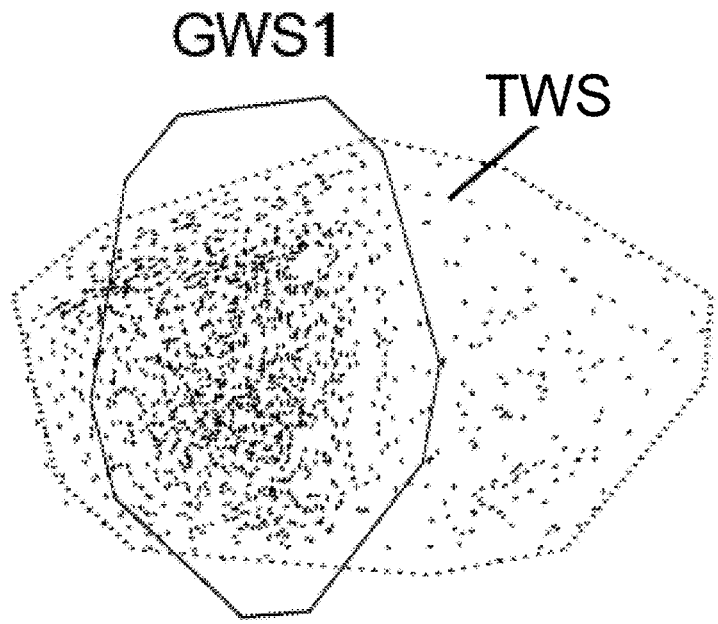
FIGS. 8(a) and 8(b) are comparisons of two grasp wrench spaces (GWSs) for the same task wrench space (TWS).
Figure 8B:
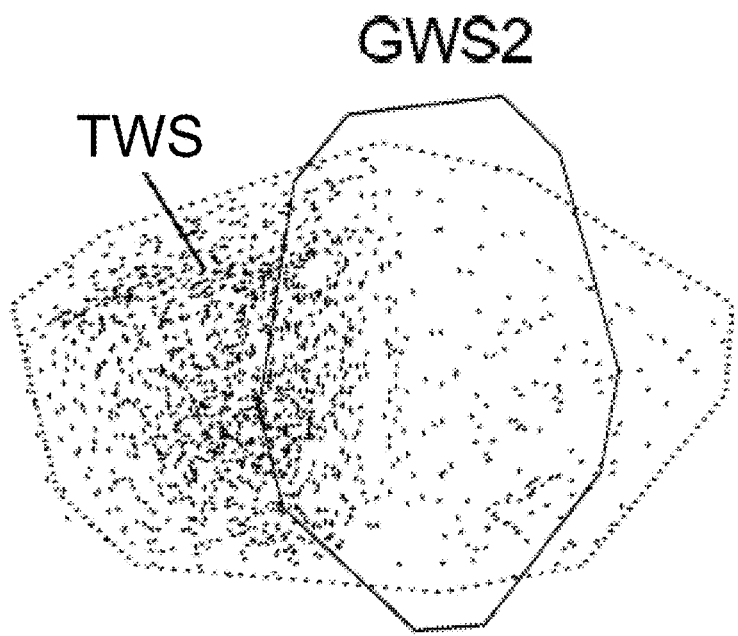
Figure 8C:
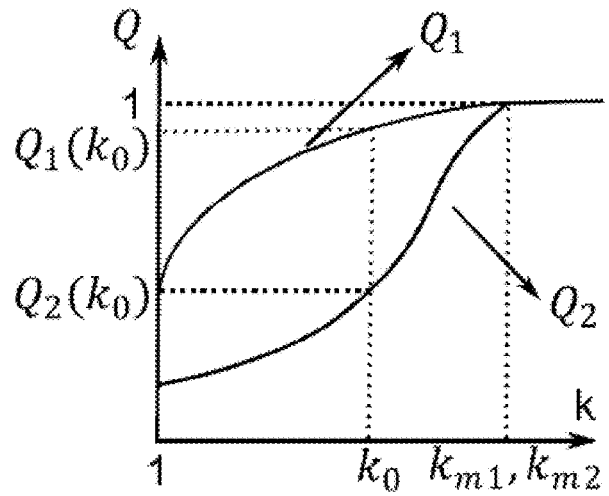
FIG. 8(c) is a graph that compares quality measures Q versus scale k between grasps in FIGS. 8(a) and 8(b) with $Q_1(k_0) > Q_2(k_0)$, and $k_{m1} = k_{m2}$.

The quality measure $k_m$ is not a reasonable constraint to the noisy TWS, given that the task is being modeled from noisy measurement data and the worst case guarantee is not a real guarantee since one can never guarantee that the data match the real world. To make $k_m$ less sensitive to noise, one may consider $k_m$ a coverage of the majority (e.g., 90%) of TWS, instead of the whole TWS. However, the computational effort to find the value of such a $k_m$ would be a critical issue. Furthermore, without considering distribution of a task, it cannot distinguish quality between two task wrenches of the same volume but with different distributions. Consider the scenario of two different GWS for the same TWS shown in FIG. 8. It can be observed that the TWS has a higher distribution in the left area. GWS1 and GWS2 in FIG. 8(a) and FIG. 8(b) have the same volume and thereby the same $k_m$. However, GWS1 has better ability than GWS2 to apply forces that frequently occur in the task, as shown in FIG. 8(c).

As a result, this quality measure takes neither noise nor the distribution of real measure into account. Therefore, a quality measure must be developed for real captured task requirements. When developing a grasp quality measurement for a task-wrench distribution, the different abilities of a grasp to apply forces along different force directions should be considered. It is preferred that less effort is required of a grasp to apply forces along directions where the disturbance force frequently happens, considering the efficiency of power consumption. The GWS is not necessary to cover the whole TWS, because less ability is required to apply forces for some force directions where force magnitude is large but rarely occurs. Therefore, it makes more sense to try to capture as much of the TWS as possible, weighted by the data distribution, than it does to try to provide a guarantee that the entire TWS is captured. Intuitively, the grasp quality can be defined as the ratio of TWS that can be covered by the scaled GWS W(G), given a scale k. The set of task wrenches that is in the scaled GWS is represented as:

$$W=\{w(t)|w(t)\in TWS \cap w(t)\in k\cdot W(G)\} \quad (7)$$

To make the computation easier, TWS can be scaled instead of GWS. Then, the equation can be written as:

$$W = \left\{w(t) \middle| w(t) \in TWS \cap \frac{1}{k}w(t) \in W(G)\right\} \quad (8)$$

The grasp quality can be represented as:

$$Q(G) = \frac{|W|}{|TWS|} \quad (9)$$

where |W| is the size, number of data samples, of the task wrenches covered by the scaled GWS, and |TWS| is the size of total task wrenches; $0 \leq Q(G) \leq 1$. The larger Q(G) is, the more disturbance wrenches can be resisted by the grasp G. Therefore, a goal of the grasp planning is to find the optimal grasp that maximizes Q(G).

Figure 8D:
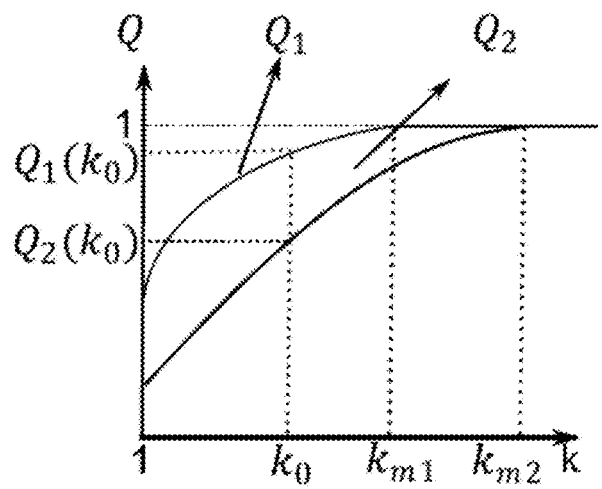
FIG. 8(d) is a graph that compares quality measures Q versus scale k between grasps in FIGS. 8(a) and 8(b) with $Q_1(k_0) > Q_2(k_0)$, and $k_{m1} < k_{m2}$.
Figure 8E:
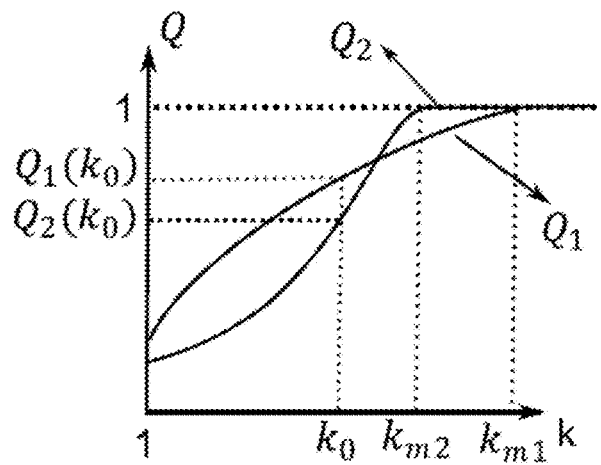
FIG. 8(e) is a graph that compares quality measures Q versus scale k between grasps in FIGS. 8(a) and 8(b) with $Q_1(k_0) > Q_2(k_0)$, and $k_{m1} > k_{m2}$.

It is noted that as k increases, Q is not linearly increasing with k, and the increasing rate of Q is not the same for different grasps (FIGS. 8(c)-(e)). Therefore, the choice of k affects the result of the optimal grasp. FIG. 9(c) compares quality $Q_1$ and $Q_2$ of the two grasps $G_1$ and $G_2$ shown in FIG. 8(a) and FIG. 8(b) as a function of k. It can be seen that $Q_1$ increases faster at the beginning. As k becomes larger, the increasing of $Q_1$ slows down. For all $k<k_m$, $Q_1>Q_2$; when $k\geq k_m$, $Q_1=Q_2=1$. It is also possible that different Q can intersect at some $k<k_m$, as illustrated in FIG. 8(e). Also, if choosing a very large value of k, Q of different G is equal to 1. Therefore, it is important to choose a reasonable k that results in a desired Q.

The scale k identifies for the amount of force the robotic hand is expected to apply. A scale $k_0$ can be determined by considering both the capability of the robotic hand and the task requirement. Suppose a unit vector $\hat{w}$; stands for a fixed direction for the disturbance wrench w(t). Let $a(t)=\|(t)\|$, the magnitude of w(t), so that the disturbance wrench can be written as $w(t)=a(t)\hat{w}(t)$. For a given task wrench set, $k_0$ is determined by the smaller value between the maximum magnitude a(t) of all wrenches in the task and the maximum forces that can be applied by the robotic hand, typically the capability $\omega_{max}$ of robot motors, can be written as:

$$k_0=\min(\max(a(t)),\omega_{max}) \quad (10)$$

for all t=1, . . . , T, where T is the number of data samples. In experiments described herein, a Barrett hand was used. The maximum finger force of the Barrett hand was 20 N, so $\omega_{max}$ was set to $\omega_{max}=20$ in order to bound $k_0$. $k_0$ can also be set to other empirical values, e.g., the amount of force that humans usually apply in a manipulation.

Computational Efficiency of Grasp Quality

To compute the quality of a grasp, the convex hull needs to be computed from the contact normals, then every sample of the TWS must be checked to determine if they are inside the scaled GWS. Convex hull can be computed by a quick hull algorithm using a Qhull C++ library, where the average case complexity is considered to be O(nlog(n)), where n is the number of contact wrenches.

To check if a point is inside the scaled GWS, one can test if the query point lies in the inward area of each facet of the convex hull. Comparing the point with one facet of the convex hull takes constant time. Thus, comparing a point with all facets of the convex hull is the worst case, taking O(K) time, where K is the number of facets of the convex hull. To check if all samples are inside the convex hull takes O(KL), where L is the number of task sampling points from the distribution of the disturbance.

Incorporation of Thumb Placement Constraint into Grasp Planning

Since a number of anthropomorphic hands have a high number of degrees of freedom (DOF) to be as powerful as human hand, thereby introducing complexity to the search in the optimization, much work has focused on providing constraints to the search space to reduce the computational complexity of the search in a high-dimensional robotic hand configuration space, for example, imposing appropriate contact points on the object. The constraint on contact points, however, is assumed to be independent of physical constraints of a given hand. This raises the problem of solving the inverse kinematics that satisfies the constraints imposed by contact points. To avoid the problem given rise by the constraints of contact points, the candidate grasp can be computed from a set of given thumb placements on the object surface, as well as the direction to which the thumb should point. Thumb positions offer a general reference of the body part to be gripped. Thumb directions provide a constraint on wrist positions and orientations. The constraint of thumb placement can be labeled manually on the object or generated automatically from examples.

Figure 9:
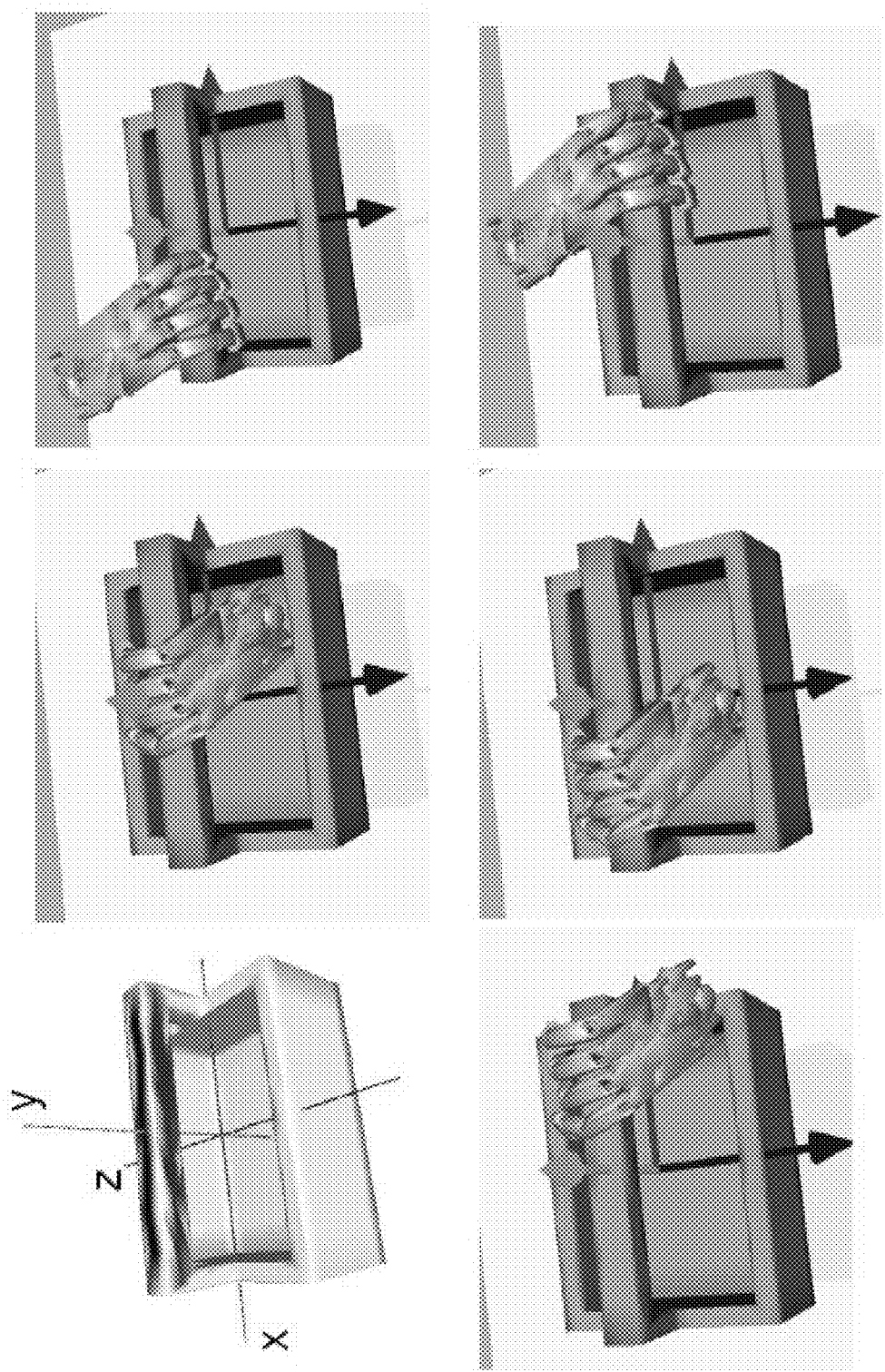
FIG. 9 comprises computer renderings of a searching procedure constrained by thumb position and direction.
Figure 10C:
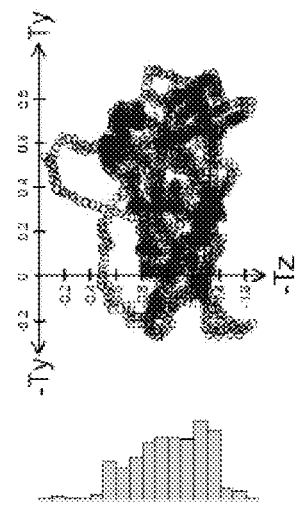
FIGS. 10(a)-10(c) are graphs that show the distribution of task wrench for a writing task with a pencil projected to Fx-Fy, Fx-Fz, and Ty-Tz subspace, respectively, where the task wrench is distributed mainly along the −Fx, Fy, and Fz directions.
Figure 10B:
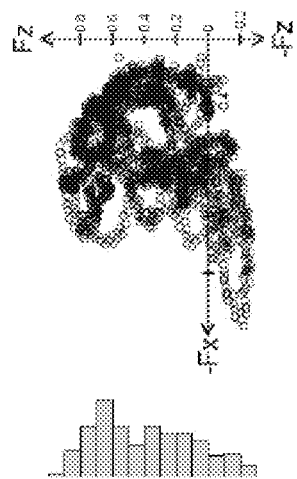
Figure 10A:
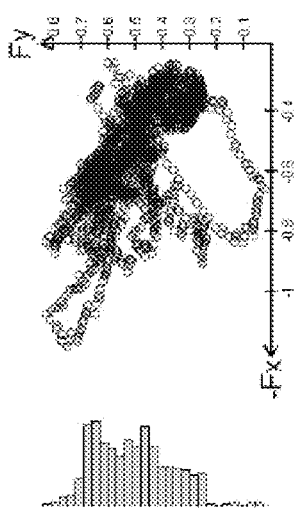
Figure 10F:
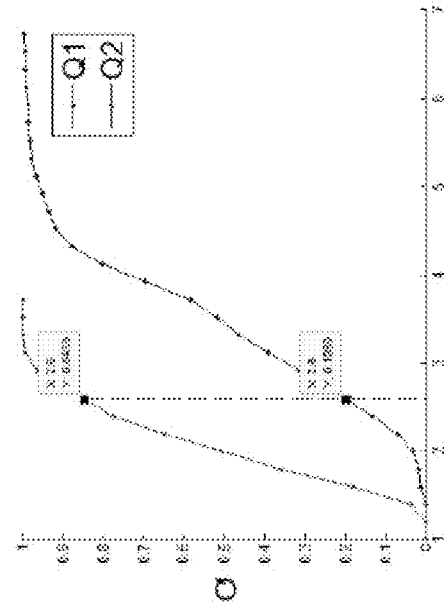
FIG. 10(f) is a graph that plots grasp quality Q versus scale k for the two hand configurations of FIGS. 10(d) and 10(e) ($Q_1$ and $Q_2$ are quality measures for hand configuration in FIGS. 10(d) and 10(e)).
Figure 10E:
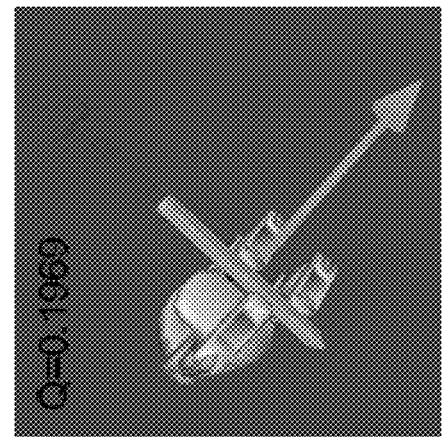
FIGS. 10(d) and 10(e) are renderings of two different hand configurations for grasping the pencil.
Figure 10D:
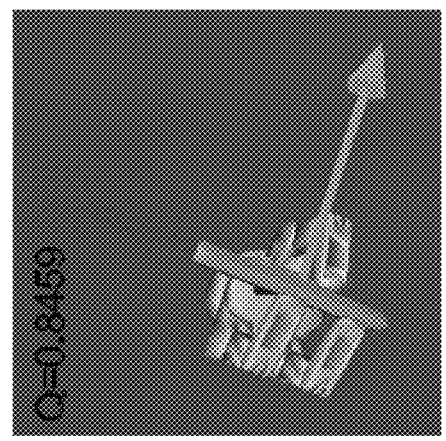

FIG. 9 shows snapshots of a searching procedure of a power grasp for a Shadow hand model throughout the constraint area of thumb placement. The user can specify a grasp type, such as power grasp or a precision grasp. In general, the power grasp has a higher grasp quality than a precision grasp, since a power grasp is trying to have as many contact points as possible with the object, resulting in a larger volume of GWS. In a precision grasp, a hand grasps the object by only the fingertips, where less power but more dexterity is preferred, and tends to cover a smaller area of a task than a power grasp. Grasp types and thumb pose together provide partial constraints to hand postures and wrist positions/orientations; hence, they reduce the search space during the optimization procedure. Moreover, since the thumb position of the robot is directly translated from the thumb position of the human demonstrator, no mapping between the two very different kinematic systems is required, which avoids the complicated correspondence problem.

Simulation Results

The above-described approach was tested in simulation for several tasks with different objects. Non-expert subjects were asked to manipulate an object in the user interface via Phantom OMNI. The interaction force between the object and the environment was captured during the demonstration with a sample rate of 100 Hz. The data set of the disturbance, compensated by object gravity, was recorded. Then, from the data set, a non-parametric statistical distribution of the disturbance was built. To reduce the computational complexity, a smaller set of data points was randomly sampled based on the non-parametric statistical distribution.

A Barrett hand model and a Shadow hand model were tested during the simulation for task-oriented grasp planning. The desired grasp type and the constraint area of the thumb location and direction were input into the simulator as well, which highly reduced the search space of the robotic hand configuration. In the simulation, the friction coefficient μ was set to be 1. The friction cone is approximated by an eight-sided pyramid. For each hand configuration, the GWS can be computed from the contact points, and the contact normals can be obtained using the open dynamics library. Grasp quality Q was calculated based on the GWS and the distribution of disturbance. The grasp planning searches the best grasp configuration that maximizes Q.

FIGS. 10-12 show three examples of object manipulation. In a first experiment, the user was asked to perform a writing motion with a pencil, where the pencil interacts with the environment at the tip. The chosen grasp should be excellent for balancing the pressure and friction on the tip. As shown in FIGS. 10(a)-(c), task wrenches are biased to the positive directions of Fy and Fz, other than the full space of the friction cone. The resulting grasp is, therefore, close to the tip. For the hand configuration shown in FIG. 10(d), Q=0.8459 at k=2.6, meaning it covers 84.59% of task wrenches, which is much larger than that of FIG. 10(e), where Q=0.1968 at the same k, because it is better to apply force along the Fy and Fz directions than that in FIG. 10(e). The quality measures $Q_1$ and $Q_2$ changing with scale k for the two grasps are compared in FIG. 10(f).

Figure 11A:
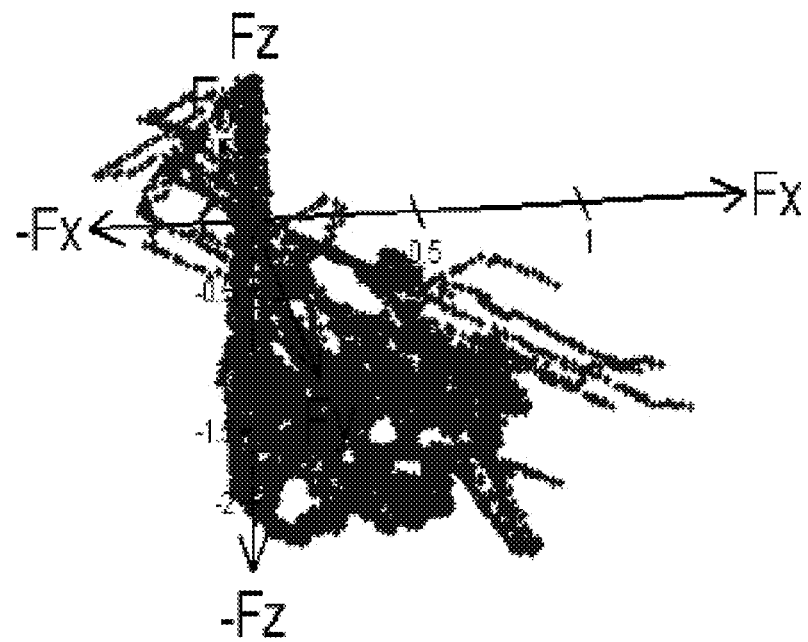
FIGS. 11(a)-11(b) are graphs that show the distribution of task wrenches for a cutting task with a knife projected to Fx-Fy-Fz and Tx-Ty-Tz subspaces, respectively, where the task wrenches are distributed mainly along the −Fz and Fx directions.
Figure 11B:
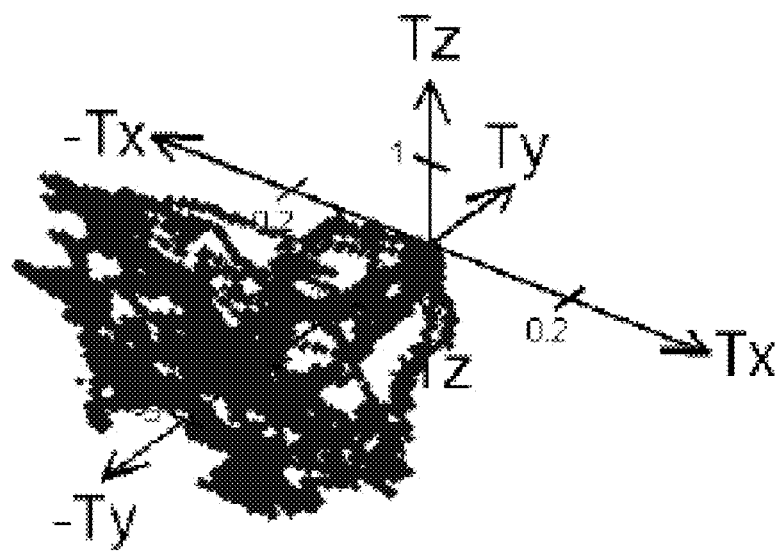
Figure 11C:
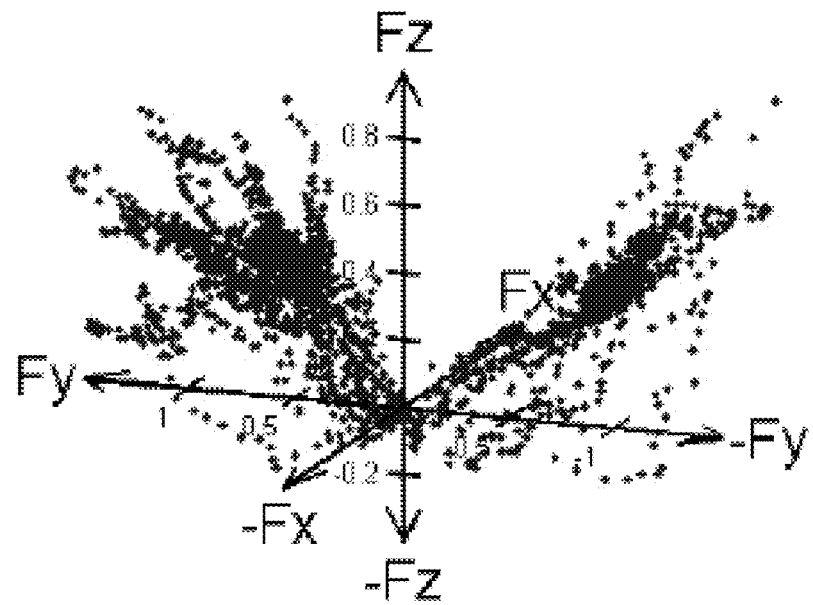
FIGS. 11(c)-11(d) are graphs that show the distribution of task wrenches for a butter-spreading task with a knife projected to Fx-Fy-Fz and Tx-Ty-Tz subspaces, respectively, where the task wrenches are distributed primarily along the +Fy, −Fy, +Fz, +Tz, and −Tz directions.
Figure 11D:
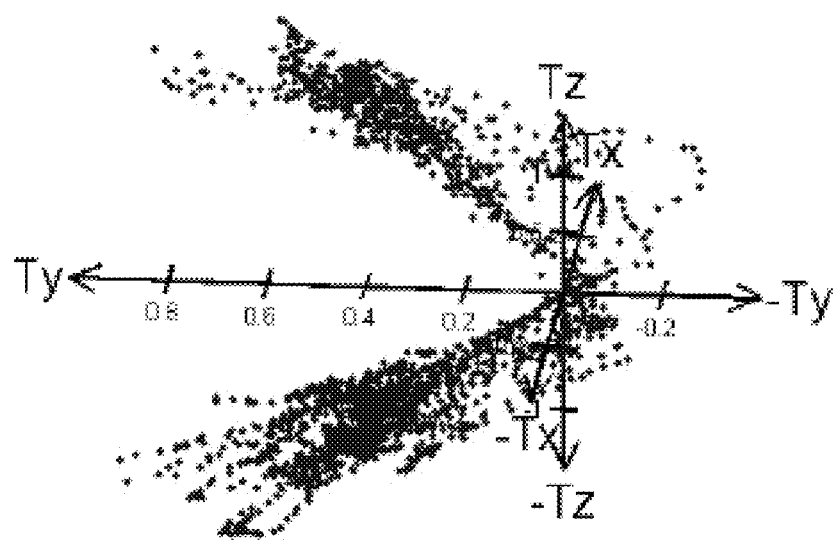
Figure 11E:
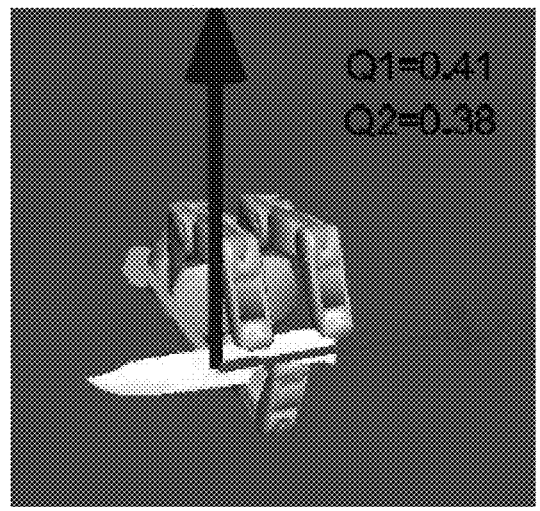
FIGS. 11(e)-(g) are computer renderings of three different hand configurations for grasping the knife, $Q_1$ is quality measure for the first task and $Q_2$ is the quality measure for the second task. Scale k was set to be 8.04 and 3.25 of the two tasks for a precision grasp planning.
Figure 11F:
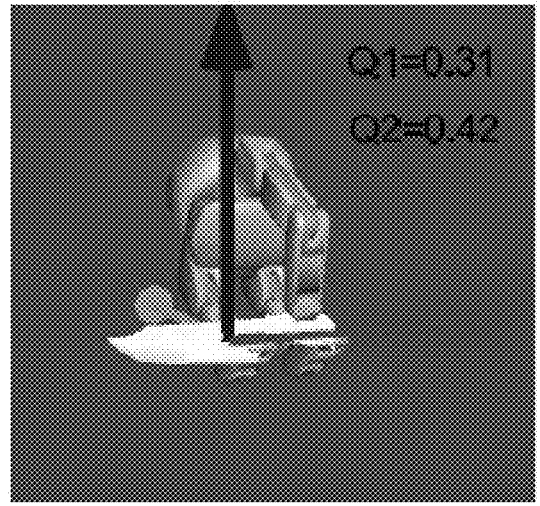
Figure 11G:
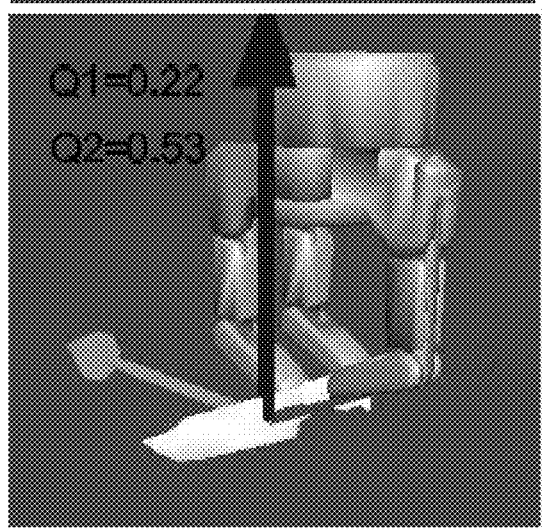

In a second experiment, grasps were compared for two tasks using a knife. The user was asked to perform a cutting motion along one direction (+x in FIG. 11) and a butter-spreading motion using both sides of the blade. The disturbance distributions for the two tasks are reported in FIGS. 11(a)-(d). As shown for the cutting task in FIG. 11(a), a grasp should be able to generate pressure along the −z direction and friction mainly along the +x direction to the blade. Torque generated along with the force is shown in FIG. 11(b). For the butter-spreading task shown in FIGS. 11(c) and 11(d), the task wrenches cover a partial area of two opposite friction cones, i.e., the grasp should be able to apply pressure along both+y and -y, and friction along+z. The thumb placement is constrained to the handle. FIGS. 11(e)-(g) contain evaluations of three grasps for the two tasks ($Q_1$ for cutting task and $Q_2$ butter spreading task). For the cutting task, the scale k was set to be 8.04, which was larger than the k=3.25 for the butter-spreading task. It can be seen that for the cutting task, the hand configuration in FIG. 11(e) is better to apply force in −Fz, along with −Ty. The hand configuration in FIG. 11(g) has the worst quality measure of the three due to its deficient ability to apply force along z directions, whereas for the butter-spreading task, the hand configuration in FIG. 11(g) is the best and in FIG. 11(e) is the worst.

In a third experiment, the user was asked to strike a plane with a hammer and the grasp planning was performed to compare results of the Barrett hand model and the Shadow hand model. It can be imagined that the chosen grasp should be excellent for balancing the large pressure on the head of the hammer. As shown in FIGS. 12(a)-(b), the distribution covers almost the whole space of the friction cone, whose axis is along +z direction, and the pressure between the hammer and the environment along +z direction is as large as 20 N. The designated grasp type during grasp planning is a power grasp in order to perform powerful manipulation; the scale k of GWS was set to be 20 for the computation of quality measure. FIG. 12 shows the results of searching through the feasible area of thumb placement for the Barrett hand model (FIGS. 12(c)-12(g)) and for the Shadow hand model (FIGS. 12(h)-(k)). It can be seen that the grasp that is closer to the head is better to counterbalance the forces that occur at the head. Note that the result of a hammer grasp is different from the intuitive grasping style of humans, who prefer to hold the handle on the other side away from the head, because humans desire to reach a large swing motion with a relatively small arm motion, as well as to generate a large impact force. The grasp optimization considers only the ability to apply force other than the arm and wrist motions. It can be observed from the figure that similar results were obtained for the two hand models, because task distribution and thumb constraint are independent of hand mechanical structures.

As concluded from the experiments, the resulting grasp with a higher grasp quality criterion tends to be more efficient to apply frequently-occurring force, using the same magnitude of resultant force as the low-quality grasp, thus improving the efficiency of power consumption.

Experimental Results on Real Platform

Experiments were also performed with a real robot system composed of a Barrett robotic hand and a FANUC robotic arm. The FANUC robotic arm was a FANUC LR Mate 200iC robotic arm with six axes. The Barrett hand has a four degrees of freedom with a three-fingered programmable grasper.

In the experiment, objects and manipulation tasks were carefully selected to evaluate the disclosed approach. Three representative manipulation tasks were selected to evaluate the proposed approach, including: Task 1: move a computer mouse on a table, Task 2: plugging a power adapter into a power strip, and Task 3: screw in a light bulb to a socket. Task 1 represents a sliding interaction with the environment. Similar tasks include using a dry-erase eraser, moving a broom or a vacuum cleaner on the floor, painting, etc. Task 2 represents a peg-in-hole motion. Similar tasks include inserting a key or a flash drive, etc. Task 3 represents a screwing motion. Similar tasks include screwing a screwdriver, jar lid, knob, key, switch, etc.

Each task was executed in 10 trials with independent noise. To minimize the influence of the position error of the object on the success rate of the manipulation, a vision system was not used, which may introduce additional errors into the predicted object position and orientation. Instead, the target object was placed at the same known location and orientation in the robot's workspace in each trial, with an estimated position error of 10 mm or less. Before each execution, the robot arm was reset to an initial position and the robotic hand was kept open. The whole execution procedure was divided to four steps. The first step was to approach the target object and reach the wrist position and orientation relative to the object, which resulted from the algorithm. Then, the robotic hand was commanded to close its fingers on the object and lift the object up from the table. These first two steps were performed autonomously by the robot. The following manipulation step was executed either autonomously or guided by humans, depending the complexity of the manipulation. The first task, i.e., moving a mouse around on a table, was relatively simple, so it was executed in a predefined routine, in which the mouse was moved along a squared path on the table. The other two tasks, however, required complicated sensing and manipulating technique to accomplish the task. Therefore, human participation was introduced in completing the remaining task by teleoperating the robot using a PHANTOM Omni haptic device. After the manipulation step was accomplished, the robot hand was then commanded to open the fingers and move up away from the object.

The Omni device was chosen due to its compact design and the intuitive positional abilities are appropriate for the teleoperation of the robotic arm. The FANUC arm and Barrett hand were connected to the same personal computer (PC) with the PHANTOM Omni. The manipulator was teleoperated at a position-based and bilateral mode, for which force feedback was provided to the user. The positions and gimbal angles of Omni stylus were continuously transmitted to the PC server in real time. The position and orientation of Omni stylus were transformed to the corresponding position and orientation of the robot end-effector in its feasible workspace. The robot arm and hand incorporate their own motion controllers. The position commands were streamed from PC server to the robot controller, so the manipulator was able to follow the Omni motion in real time. For safety, the speed was constrained up to a feedrate of 30% of the maximum speed. The force sensed by the force sensor embedded in the robot wrist was feedback to the Omni, so the user was able to feel the contact force when the robotic hand is in contact with the environment.

To evaluate the proposed algorithm on physical robotic platform, the success rate was compared with that of the widely used non-task-oriented planning method that optimizes the epsilon quality $\epsilon$. The epsilon quality E measures the radius of the largest six-dimensional ball centered at the origin and enclosed with the convex hull of the GWS. The epsilon quality refers to the magnitude of the disturbance wrenches that can be compensated by the grasp in the worst case. The larger the epsilon quality is, the more stable the grasp can be in terms of resisting the worst case disturbance. In a previous study, a grasp with an epsilon quality of 0.1 or greater is considered to be a stable grasp that tends to be robust to uncertainties. The results were not compared with any other task-oriented method because, to the best of the inventors' knowledge, none of the related research on task-oriented grasp planning has reported any success rate on the execution of manipulation tasks in a physical system. Most work tested on real robotic platforms are pick-up tasks.

Figure 13A:
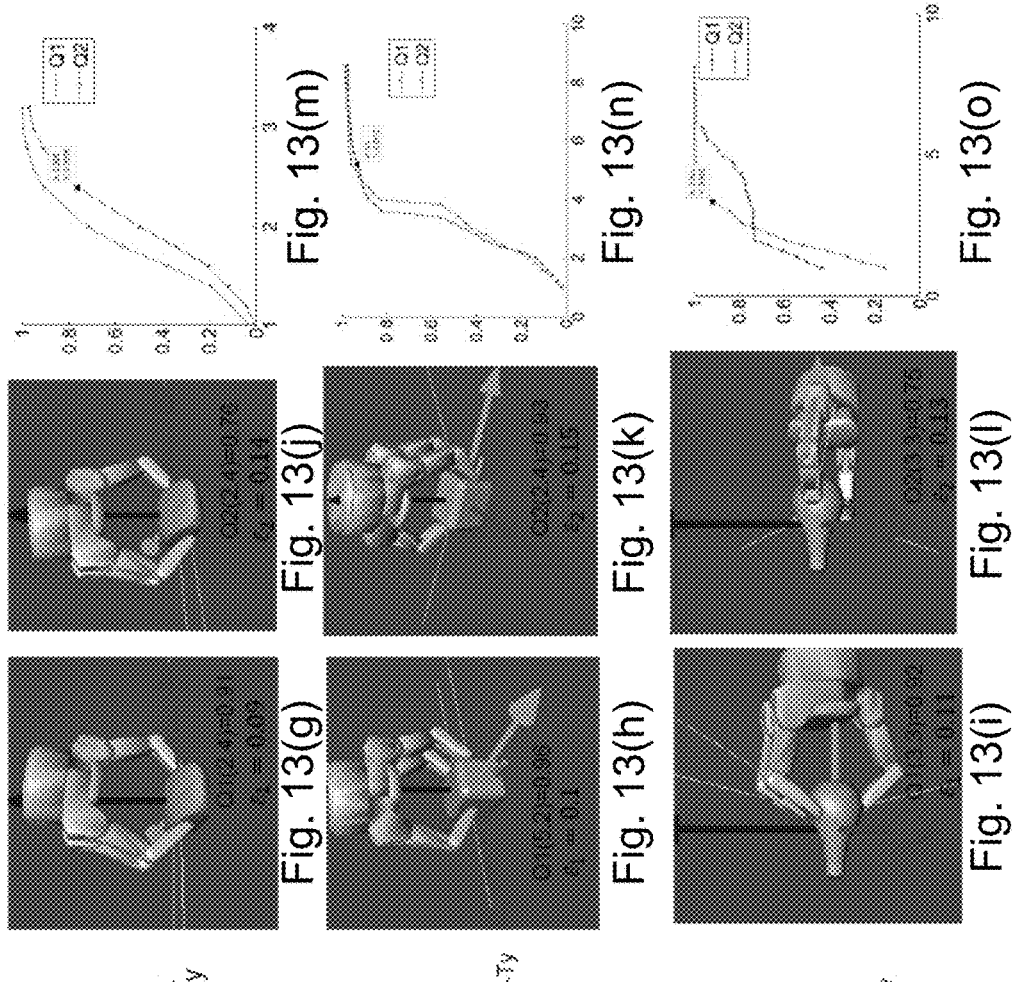
Figure 13O:
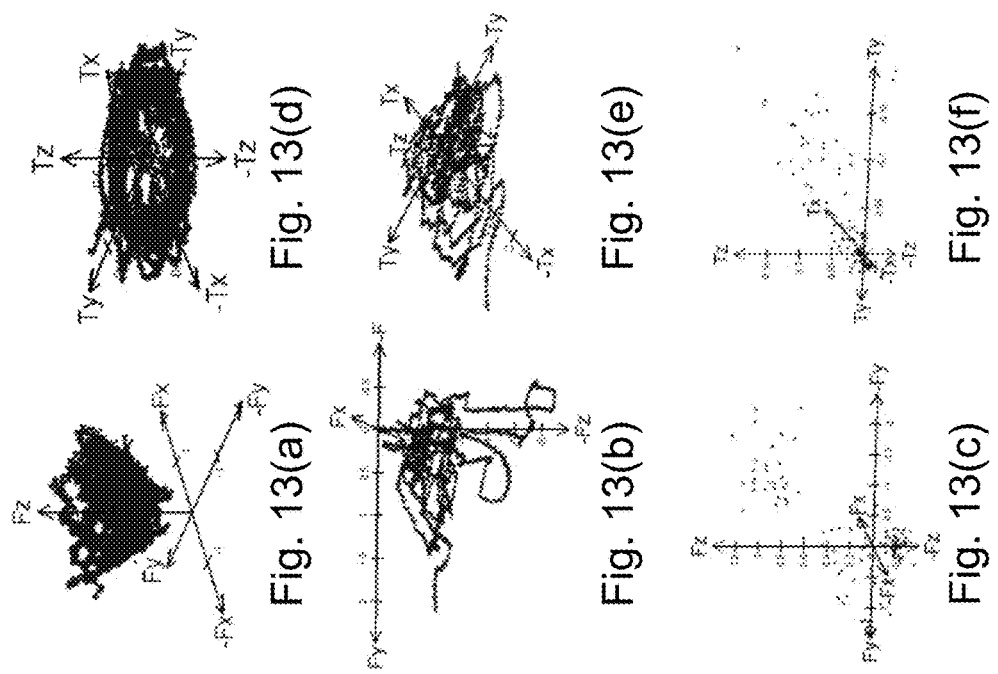

The resulting hand configurations from both the proposed algorithm and the non-task-oriented grasp planning algorithm are shown in FIG. 13. The first two columns (FIGS. 13(a)-13(f)) are measured task disturbances projected in three-dimensional force and torque subspaces, respectively. The third column (FIGS. 13(a)-13(i)) and the fourth column (FIGS. 13(i)-13(l)) are the optimization results from the proposed method and the non-task-oriented planning, respectively, with both of the two quality metrics Q and $\epsilon$ marked in each corresponding figure. Again, the scale k of the marked quality metric Q is chosen by Equation 10. The fifth column (FIGS. 13(m)-13(O)) shows the proposed task-disturbance-based grasp quality Q as a function of scale k for the two hand configurations shown in the third column and the fourth column. Since hand configurations in column 3 are those that maximize Q and hand configurations in column 4 are those that maximize $\epsilon$, $Q_1$ in column 3 is greater than $Q_2$ in column 4 and $\epsilon_1$ in column 3 is less than column 4.

The execution on real robotic platform of both the proposed algorithm and the non-task-oriented planning method for all of the three tasks were compared and the success rate of both algorithms was compared in Table 1. If the object is sliding out of the robotic hand during the task execution because of the outside disturbance from collision, it is counted as a failure. Otherwise, if the robot successfully completes the task without dropping the object, it is counted as a success. It can be observed that, overall, hand configurations resulting from the proposed algorithm have a higher success rate (average of 70%), compared to that of the non-task-oriented planning algorithm (average of 43.3%) in executing the manipulation tasks. The results imply that the proposed quality metric is more consistent with the success rate of the manipulation tasks than the non-task-oriented algorithm. The results also verify the effective choice of scale k.

TABLE 1

| Task | Success Rate of Task Disturbance Based Grasp Planning | Success Rate of non-task oriented Grasp Planning |
| --- | --- | --- |
| Task 1 | 60% | 40% |
| Task 2 | 80% | 70% |
| Task 3 | 70% | 20% |
| Overall | 70% | 43.3% |

Task 1 required the robot to slide the mouse on a plane while keeping in touch with the plane. The disturbance was distributed mainly on the boundary of the friction cone (FIG. 13(a)), so the grasp was to counteract the friction sliding on the plane and the support force from the plane. Both resulting hand configurations grasped the mouse on the side face (FIGS. 13(g) and 13(j)), but in the latter hand configuration, fingers were closer to the bottom edge. It was observed in the experiment that in the latter hand configuration, the mouse was easier to slide up from the fingers during the execution, because the side faces were inclined inward. In Task 2, both the success rate and the quality Q as a function of scale k are close to each other, although they gripped the object on different faces. The success rate of both approaches appeared to be similar as well. In Task 3, In the latter hand configuration resulting from the non-task-oriented approach, the other two fingers were closer to the base than thumb. When the robot was trying to screw the bulb to a socket, the bulb was fairly easy to be dropped by the robot. In Task 3, the success rate of our approach was much higher than the non-task-oriented approach, demonstrating its higher capability to resist the task disturbance.

Example System

Figure 14:
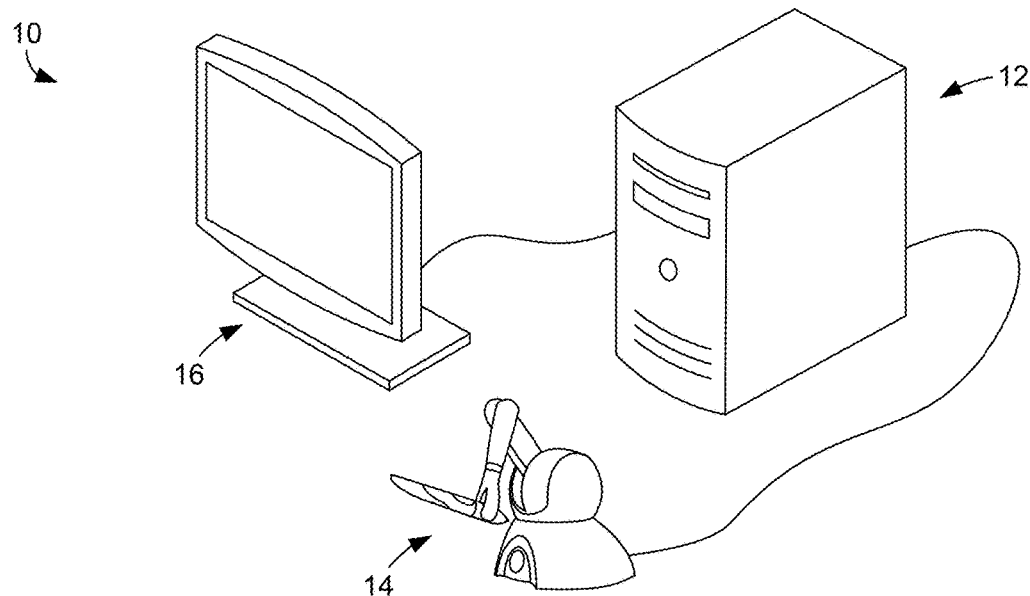
FIG. 14 is a schematic diagram of an embodiment of a system for planning a robot grasp.

FIG. 14 illustrates an example system 10 that can be used to plan a robot grasp in the manner described above. As shown in the figure, the system 10 includes a computer 12, such as a desktop or server computer, and a user interface that, in this example, includes a haptic device 14 and a display 16. Although particular components are shown in FIG. 14 and those components are shown having particular configurations, it will be understood that the system 10 can comprise further and/or alternative components and the components may have alternative configurations.

Figure 15:
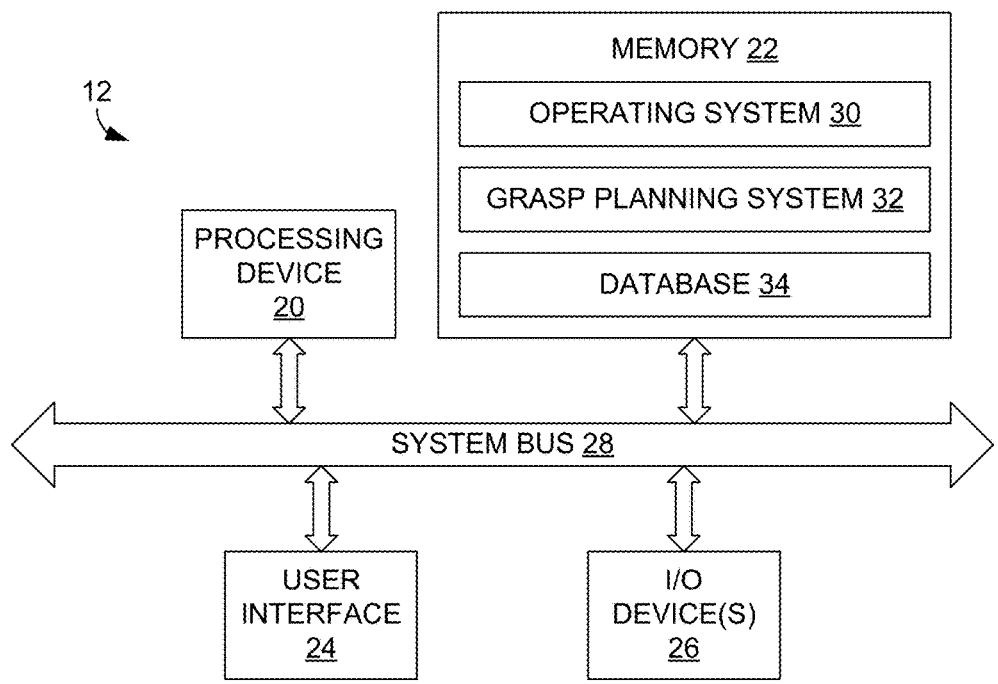
FIG. 15 is block diagram of an embodiment of a computer shown in FIG. 14.

FIG. 15 illustrates an example configuration for the computer 12. As shown in this figure, the computer 12 comprises a processing device 20, memory 22, a user interface 24, and one or more input/output (I/O) devices 26, each of which is connected to a system bus 28. The processing device 20 can, for example, include a central processing unit (CPU) that is capable of executing instructions stored within the memory 22. The memory 22 includes any one of or a combination of volatile memory elements (e.g., RAM) and nonvolatile memory elements (e.g., hard disk, ROM, etc.).

The user interface 24 comprises one or more devices that can be used to enter user inputs into the computer 12. As noted above, the user interface 24 can comprise the haptic device 14 and the display 16 (FIG. 1). In addition, the user interface 24 can comprise a keyboard and/or mouse. The I/O devices 26 comprise components that enable the computer 12 to communicate with other devices, including the haptic device 14.

The memory 22 (a non-transitory computer-readable medium) stores programs including an operating system 30 and a grasp planning system 32. The operating system 30 controls the general operation of the computer 12, while the grasp planning system 32 comprises algorithms (i.e., logic) that are used to plan a robot grasp for a particular object and a particular task to be performed by the robot using the object. The memory 22 further comprises a database 34, which can be used to store grasps that are formulated by the grasp planning system 32.

Example of Grasp Planning

Figure 16:
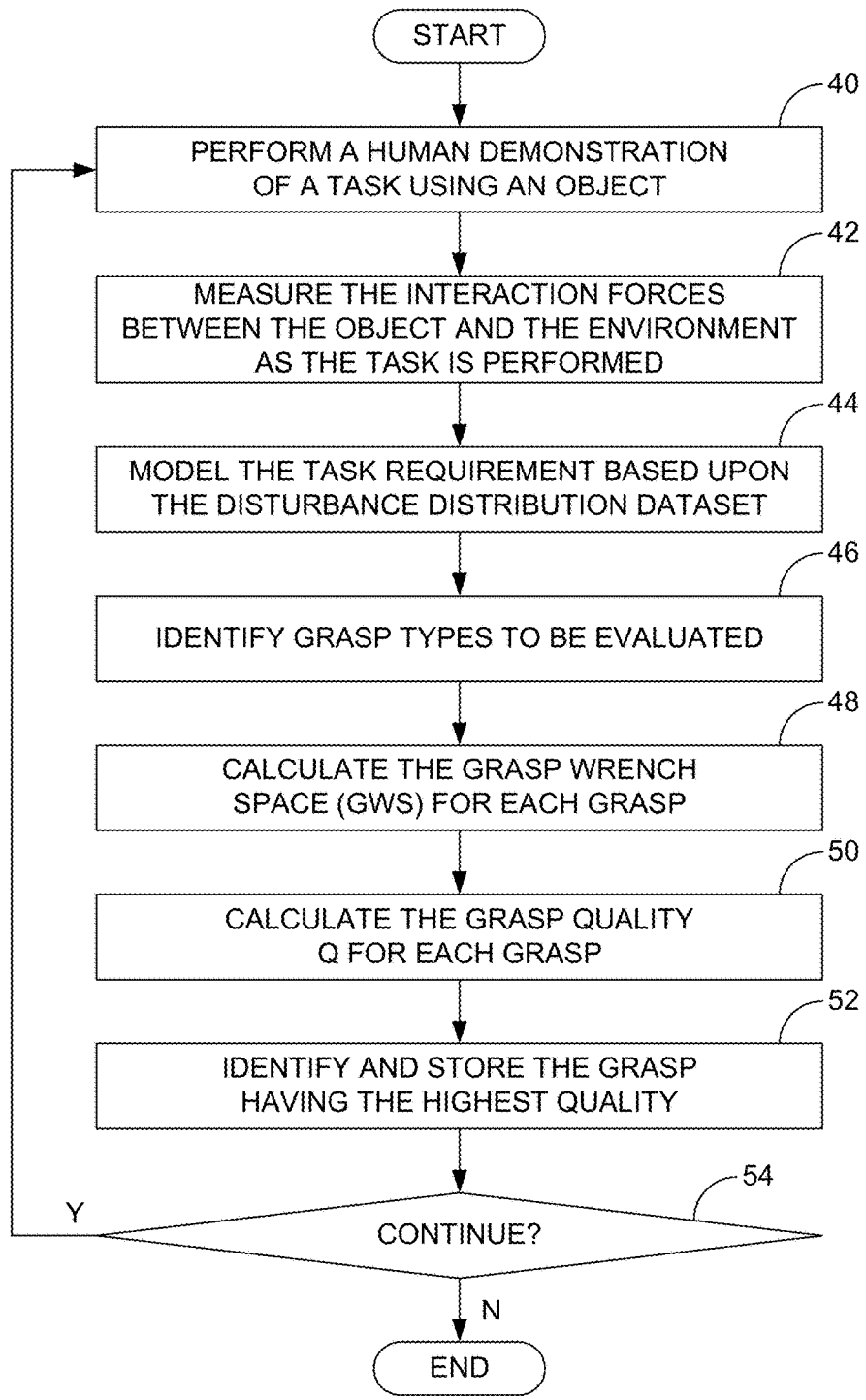
FIG. 16 is a flow diagram of an embodiment of a method for planning a robot grasp.

FIG. 16 is a flow diagram that presents an example of a method for planning a robot grasp in the manner describe above. In some embodiments, the method can be practiced by the system 10 shown in FIG. 14.

Beginning with block 40 of FIG. 16, a human demonstration of a task using an object is performed. The object can be any object that is to be grasped by a robot and the task can be any task that is to be performed by the robot using the object. As an example, the object can be a knife and the task can be cutting something with the knife. As noted above, the demonstration can be performed in the real world or in the virtual world. In the former case, a user performs the task using an actual object in an actual environment. In such a case, the object can be instrumented so that the forces acting upon the object within the environment can be measured. For example, if the object is a knife and if the task is to cut something, the knife can comprise one or more sensors that measure the forces imposed upon the knife as the cutting is performed. In the latter case, the user performs the task using a virtual object in a virtual environment. For example, a virtual knife and a virtual environment can be modeled on a computer (such as the computer 12) and the user can virtually cut something using the virtual knife in the virtual environment by manipulating a haptic device (such as the haptic device 14). In such a case, the forces acting upon the knife can be measured using the model.

Irrespective of whether the human demonstration is actual or virtual, the interaction forces between the object and the environment can be measured as the task is performed, as indicated in block 42. As described above, these forces can be continually measured during performance of the task so as to obtain a set of task-related disturbance distribution data. This disturbance dataset represents a task wrench space (TWS) that comprises the set of all wrenches acting upon the object as the task is performed. As was also described above, the TWS can be modified to include a non-contact wrench that accounts for forces acting upon the object that are not associated with interaction between the object and another object in the real or virtual environment, such as gravity and inertia.

Referring next to block 44, the task requirement can be modeled based upon the measured disturbance distribution dataset. As described above, a non-parametric statistical model can be generated that comprises a non-parametric statistical distribution of the disturbance. In some embodiments, a smaller set of data points can be downsampled from the non-parametric statistical distribution to reduce computational complexity. As was also described above, the task requirement can alternatively be modeled as a parametric statistical distribution, such as a Gaussian mixture model with expectation and maximization.

At this point, grasp types can be identified that are to be evaluated in relation to satisfying the task requirement, as indicated in block 46. The grasp types can be selected by the user or the grasp planning system can automatically select the grasp types to be evaluated. In some embodiments, the grasp types can be constrained by a human thumb location and direction, which can either be manually input by the user or automatically detected by the grasp planning system from the task demonstration. In either case, the thumb location and direction can significantly reduce the search space for the robotic hand configuration.

With reference next to block 48, the grasp wrench space (GWS) of each identified grasp can be calculated using the contact points and contact normals of the grasp, and the friction coefficient of the object. At this point, the quality Q of each grasp can be calculated, as indicated in block 50. As described above, this grasp quality quantifies the portion of the disturbance distribution that the grasp covers. This is graphically depicted by FIGS. 8(*a*) and 8(*b*), which shows two GWSs being compared with the TWS. By calculating the grasp quality, the particular GWS, and therefore grasp, that best matches the TWS can be identified. This will be the grasp that maximizes Q and will be most stable for the underlying task, meaning that it is the grasp that will most likely withstand the forces imposed upon the object when the task is performed. As described above, the quality can be calculated using Equation 9, which outputs a ratio of the GWS and the TWS.

Once the grasp qualities have been calculated, the grasp having the highest quality can be identified and stored for later use by a robot, as shown in block 52. In some embodiments, the grasp can later be manually selected by a user for use by a robot in performing a particular task with a particular object. In other embodiments, a robot can automatically select the grasp based upon recognition of one or more of the object and the task to be performed.

Turning to decision block 54, if further grasps are to be planned, flow returns to block 40 at which a new demonstration can be performed and the process can be repeated. If no further grasps are to be planned, however, flow for the session is terminated.

The invention claimed is:

1. A method for planning a robot grasp, the method comprising:
   measuring interaction forces imposed on an object by an environment while a task is demonstrated by a human user using the object to obtain a disturbance distribution dataset, wherein demonstrating the task comprises the user demonstrating the task with an actual object in an actual environment, wherein the object comprises one or more sensors that measure the forces, or comprises the user demonstrating the task with a virtual object in a virtual environment, wherein the virtual object is controlled in the virtual environment by the user with a haptic device;
   a computer modeling a task requirement based upon the disturbance distribution dataset;
   the computer identifying multiple robot grasp types stored in computer memory that can be used to satisfy the task requirement;
   the computer calculating a grasp wrench space for each identified robot grasp type;
   the computer calculating a grasp quality of each robot grasp type; and
   the computer selecting the robot grasp type that has the highest grasp quality.

2. The method of claim 1, wherein measuring interaction forces comprises continually measuring the forces during performance of the task to obtain a task wrench space that comprises the set of all wrenches acting upon the object as the task is performed.

3. The method of claim 2, further comprising modifying the task wrench space to account for gravity.

4. The method of claim 1, wherein modeling a task requirement comprises modeling the task requirement as a non-parametric statistical distribution of disturbance.

5. The method of claim 4, further comprising downsampling the statistical distribution to reduce computational complexity.

6. The method of claim 1, wherein identifying robot grasp types comprises constraining the grasp types according to a human thumb location and direction relative to the object.

7. The method of claim 1, wherein calculating a grasp wrench space comprises calculating the grasp wrench space using contact points and contact normals of the grasp and a friction coefficient of the object.

8. The method of claim 1, wherein calculating a grasp quality comprises quantifying the portion of the disturbance distribution that the grasp covers.

9. The method of claim 8, wherein calculating the grasp quality comprises calculating a ratio of a task wrench space of the task and the grasp wrench space.

10. A non-transitory computer-readable medium comprising:
logic configured to receive interaction forces imposed on an object by an environment to obtain a disturbance distribution dataset, the forces having been measured while a task was demonstrated using the object, wherein demonstrating the task comprises the user demonstrating the task with an actual object in an actual environment, wherein the object comprises one or more sensors that measure the forces, or comprises the user demonstrating the task with a virtual object in a virtual environment, wherein the virtual object is controlled in the virtual environment by the user with a haptic device;
logic configured to model a task requirement based upon the disturbance distribution dataset;
logic configured to identify robot grasp types that can be used to satisfy the task requirement;
logic configured to calculate a grasp wrench space for each identified robot grasp type;
logic configured to calculate a grasp quality of each robot grasp type, and
logic configured to select the robot grasp type that has the highest grasp quality.

11. The non-transitory computer-readable medium of claim 10, wherein the logic configured to model a task requirement is configured to model the task requirement as a non-parametric statistical distribution of disturbance.

12. The non-transitory computer-readable medium of claim 10, wherein the logic configured to identify robot grasp types is configured to constrain the grasp types according to a human thumb location and direction relative to the object.

13. The non-transitory computer-readable medium of claim 10, wherein the logic configured to calculate a grasp wrench space is configured to calculate the grasp wrench space using contact points and contact normals of the grasp and a friction coefficient of the object.

14. The non-transitory computer-readable medium of claim 10, wherein the logic configured to calculate a grasp quality is configured to calculate a ratio of a task wrench space of the task and the grasp wrench space.

15. A system for planning a robot grasp, the system comprising:
a force measurement device comprising one or more sensors configured to measure interaction forces imposed on an actual object when the object is used by a human user to perform a task in an actual environment or a haptic device configured to measure interaction forces imposed on a virtual object when the haptic device is used by the human user to perform a task with the virtual object in a virtual environment;
a computer having a non-transitory computer-readable medium that stores a grasp planning system including:
logic configured to receive the interaction forces measured by the force measurement device to obtain a disturbance distribution dataset,
logic configured to model a task requirement based upon the disturbance distribution dataset,
logic configured to identify robot grasp types that can be used to satisfy the task requirement,
logic configured to calculate a grasp wrench space for each identified robot grasp type,
logic configured to calculate a grasp quality of each robot grasp type, and
logic configured to select the robot grasp type that has the highest grasp quality.

16. The system of claim 15, wherein the logic configured to calculate a grasp quality is configured to calculate a ratio of a task wrench space of the task and the grasp wrench space.

17. The system of claim 15, wherein the logic configured to model a task requirement is configured to modify the task requirement to account for gravity.

18. The system of claim 15, wherein the logic configured to model a task requirement is configured to model the task requirement as a non-parametric statistical distribution of disturbance.

19. The system of claim 18, wherein the logic configured to model a task requirement is further configured to downsample the statistical distribution to reduce computational complexity.

20. The system of claim 15, wherein the logic configured to identify robot grasp types is configured to constrain the grasp types according to a human thumb location and direction relative to the object.

21. The system of claim 15, wherein the logic configured to calculate a grasp quality is configured to calculate the grasp wrench space using contact points and contact normals of the grasp and a friction coefficient of the object.

22. The system of claim 15, wherein the logic configured to calculate a grasp quality is configured to quantify the portion of the disturbance distribution that the grasp covers.

* * * * *